(12) United States Patent
Venkatasubramanyam

(10) Patent No.: US 12,327,493 B2
(45) Date of Patent: *Jun. 10, 2025

(54) SMART-LEARNING AND KNOWLEDGE RETENTION

(71) Applicant: Gopalakrishnan Venkatasubramanyam, Pleasanton, CA (US)

(72) Inventor: Gopalakrishnan Venkatasubramanyam, Pleasanton, CA (US)

(*) Notice: Subject to any disclaimer, the term of this patent is extended or adjusted under 35 U.S.C. 154(b) by 370 days.

This patent is subject to a terminal disclaimer.

(21) Appl. No.: 17/902,884

(22) Filed: Sep. 4, 2022

(65) Prior Publication Data

US 2022/0415201 A1 Dec. 29, 2022

Related U.S. Application Data

(63) Continuation-in-part of application No. 16/795,618, filed on Feb. 20, 2020, now Pat. No. 11,468,780.

(51) Int. Cl.
*G06F 16/24* (2019.01)
*G06F 7/14* (2006.01)
*G06F 16/9535* (2019.01)
*G09B 7/04* (2006.01)

(52) U.S. Cl.
CPC .......... *G09B 7/04* (2013.01); *G06F 7/14* (2013.01); *G06F 16/9535* (2019.01)

(58) Field of Classification Search
CPC .... G06F 16/24; G06F 16/245; G06F 16/3329; G09B 7/12
See application file for complete search history.

(56) References Cited

U.S. PATENT DOCUMENTS

2017/0351962 A1* 12/2017 Appel ............... G06N 7/01
2021/0264804 A1* 8/2021 Venkatasubramanyam ........
G06N 5/04
2021/0398526 A1* 12/2021 Noorizadeh ......... G10L 15/005
2022/0406210 A1* 12/2022 Lopes Do Nascimento Filho ......
H04L 67/1095

* cited by examiner

Primary Examiner — Daniel Abebe
(74) Attorney, Agent, or Firm — Yantra Patents LLC; Anand P Narayan

(57) ABSTRACT

A computer-implemented method and a smart-learning and knowledge retrieval system (SLKRS) are provided for imparting adaptive and personalized e-learning based on continually artificially learned unique characteristics of a knowledge seeker. In response to a query received from the knowledge seeker, the SLKRS retrieves and sends in an immersive format one of the generated experiences or an experience created based on an artificially intelligent understanding of the received query. The SLKRS computes a coefficient of retention for the knowledge seeker based on a test of the ability of the knowledge seeker to recall a concept after the passage of a predetermined length of time, and after being exposed to a predetermined number of applications of the concept. The SLKRS generates interventions and improved experiences to provide adaptive and personalized e-learning to the knowledge seeker based on the computed coefficient of retention.

20 Claims, 13 Drawing Sheets

SMART-LEARNING AND KNOWLEDGE RETENTION

CROSS-REFERENCE TO RELATED APPLICATIONS

This application is a continuation-in-part of U.S. patent application Ser. No. 16/795,618 titled "SMART LEARNING AND KNOWLEDGE RETRIEVAL SYSTEM" filed Feb. 20, 2020, now U.S. Pat. No. 11,468,780, the contents of which are hereby incorporated herein by reference in their entirety.

BACKGROUND

The current state of e-learning does not make it a powerful contender to traditional face-to-face learning. Learning management systems generally do not provide effective automated personalized feedback to learners. Learning management systems also do not provide learning experiences that draw on multiple aspects of learning including association of related concepts in the increasingly multi-disciplinary era of knowledge. Currently, e-learning might also lead to social isolation and stunted development of communication skills in academic settings. At present, this is only remedied by blended learning environments comprising interaction with actual persons either in-person or through video and audio conferencing. To address these lacunae, there is a need for a personalized immersive e-learning experience involving an artificially intelligent understanding of a learner's learning needs and academic shortcomings. Furthermore, there is a need for a computer-implemented method and system that receives learners' feedback through various modes—text, audio, and video—and generates appropriate responses and suitably tailored learning experiences using artificial intelligence and machine learning.

For knowledge retrieval, existing systems typically crawl and collect information, search through the collected information using various algorithms, for example, the PageRank® algorithm from Google® when a query arrives, and send a response to queries, and send information to a browser or via an application programming interface (API) to the requesting system or person. They follow the Crawl/Collect—Search—Respond (CSR) process. The existing systems also either serve up text, for example, Google® Search, images, for example, Google® Image Search, or videos, for example Google® YouTube®. These digital assets, namely, text, images, video, etc., are also typically stored in separate data stores and users have to access these stores separately. There is a need for a centralized repository of relevant information that can be queried to get an immediate relevant response with multiple digital assets related to the query. Digital asset management that, apart from just storing, also tags and cross-references digital assets for quick retrieval are available. However, there is a need for a system that utilizes artificial intelligence and machine learning to provide relevant and useful responses comprising multiple digital assets for queries in the education domain. There is a need for an intelligent system for knowledge representation and retrieval.

Jobs are increasingly in need of multi-disciplinary skills that can be gained by combining multiple subjects and applying concepts from one subject to another. A growing number of knowledge seekers are concerned that they are not being taught what they need to learn. They are learning the same things that people learned decades ago. Moreover, different people are made to learn the same things the same way. Furthermore, during the course of education, students are required to learn a vast number of concepts each year, so reinforcing the students with those concepts and seeing what the student picks up does not work. Furthermore, e-learning is not interesting to knowledge seekers when they have to mostly sit and watch videos. They need a better way to learn. There is a need for a system that adapts to individual knowledge seekers to teach them an integrated multidisciplinary curriculum through an immersive, fun, and intimate learning experience. Moreover, there is a need for personalization of the learning process for each knowledge seeker. Furthermore, there is a need to capture a knowledge seeker's current knowledge level and capability to allow the knowledge seeker to apply and understand concepts, and use the information to allow the knowledge seeker get proficient in concepts that they find difficult to comprehend through interactive and interesting means. Furthermore, there is a need for a system that is always accessible through e-learning that adapts and engages a knowledge seeker to make him or her proficient at his or her own pace while maintaining interest levels.

Hence, there is a long felt but unresolved need for a computer-implemented method and a system that provides adaptive and personalized e-learning based on the continually, artificially learned, and unique characteristics of a knowledge seeker.

SUMMARY OF THE INVENTION

This summary is provided to introduce a selection of concepts in a simplified form that are further disclosed in the detailed description of the invention. This summary is not intended to determine the scope of the claimed subject matter.

The computer-implemented method and smart-learning and knowledge retrieval system (SLKRS) disclosed herein address the above recited need for providing adaptive and personalized e-learning based on continually artificially learned unique characteristics of a knowledge seeker. The computer-implemented method, using the SLKRS, provides artificial intelligence based knowledge representation and retrieval to answer queries from a knowledge seeker or another system. The method adapts multidisciplinary educational courses to knowledge seekers and present an immersive, fun and intimate e-learning experience. For example, the method teaches applied computer science through an integrated, interdisciplinary curriculum designed to engage each knowledge seeker's unique interests. The method and the SLKRS utilize artificial intelligence and machine learning to adapt and personalize the learning processes to each knowledge seeker. The method, using the SLKRS, generates personalized knowledge concept graphs for each knowledge seeker. Through assessments and interactions, the method captures what a knowledge seeker knows and how well he or she can apply and understand concepts. The method, using the SLKRS, assists the knowledge seeker learn concepts he or she struggles with by connecting those concepts to subjects where he or she thrives all while using interactive interfaces to provide constant and immediate help in a fun and interactive manner. The method uses regular assessments to gauge progress and continuously adapts learning paths to make every knowledge seeker proficient at his or her own pace. The method provides a learning platform that is always accessible to knowledge seekers through an Internet connection.

The computer-implemented method and the smart-learning and knowledge retrieval system (SLKRS) provides adaptive and personalized e-learning based on continually artificially learned unique characteristics of a knowledge seeker. The SLKRS ingests data from multiple sources in multiple formats including the Internet, documents in a plurality of formats, social media streams, blogs, web pages, videos, audios, images, games, virtual reality simulations, and augmented reality simulations. The SLKRS merges the data into a knowledge base to create an ontology based on computed strengths of terms found in the sources from which the data is ingested. The SLKRS computes the strengths of terms found in the sources using parameters comprising frequency of occurrence of those terms in other sources, relevance of the terms to an already created portion of the ontology, and inputs from the knowledge seeker. The SLKRS indexes and tags the sources from which the data is ingested based on the computed strengths of the terms found in those sources. The SLKRS assimilates the merged data to generate experiences. The SLKRS uses the assimilation of the merged data to create knowledge concept graphs based on the computed strengths of the terms found in the sources from which the data is ingested. The SLKRS builds experiences from digital assets, for example, videos, games, virtual reality simulations, and augmented reality simulations, in the merged data. Digital assets are text or media that are in a machine-readable format and which include rights to use them. Experiences are digital assets that are generated by the SLKRS.

The smart-learning and knowledge retrieval system (SLKRS) receives a query from the knowledge seeker through one of multiple interfaces comprising text boxes, chat interfaces, voice interfaces, phone applications, interactive chat bots, virtual reality interfaces and augmented reality interfaces. The SLKRS understands the received query using artificial intelligence and machine learning programs executable by at least one processor configured to execute computer program instructions. The SLKRS retrieves and sends one of the generated experiences or an experience created based on the artificially intelligent understanding of the received query in an immersive format to the knowledge seeker through one of the interfaces to interact with the sent experience. The SLKRS receives feedback from the knowledge seeker through one of the interfaces in response to the sent experience. The smart-learning and knowledge retrieval system (SLKRS) computes a coefficient of retention for the knowledge seeker based on a test of the ability of the knowledge seeker to recall a concept after the passage of a predetermined length of time and after being exposed to a predetermined number of applications of the concept. The SLKRS uses the computed coefficient of retention to measure an ability of the knowledge seeker to learn and to show continued interest in an e-learning course. The SLKRS generates interventions and improved experiences for the knowledge seeker based on the computed score to provide adaptive and personalized e-learning.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and structures/components disclosed herein. The description of a method step or a structure/component referenced by a numeral in a drawing is applicable to the description of that method step or structure/component shown by that same numeral in any subsequent drawing herein.

DETAILED DESCRIPTION OF THE INVENTION

Disclosed herein is a smart-learning and knowledge retrieval system (SLKRS) for providing adaptive and personalized e-learning based on continually, artificially learned unique characteristics of a knowledge seeker. The computer-implemented method disclosed herein is an approach for building an artificial intelligence-based knowledge representation and retrieval to answer queries from a user or another system. The method adapts and personalizes the learning process to each knowledge seeker by generating personalized knowledge concept graphs for each knowledge seeker. Through assessments and interactions, the SLKRS captures in the knowledge concept graphs that the knowledge seeker knows, and how well the knowledge seeker can apply and understand concepts. The SLKRS assists the knowledge seeker learn concepts that are difficult for the knowledge seeker to comprehend, by connecting them to the concepts that are readily understandable to the knowledge seeker. The SLKRS engages multiple interfaces, for example, conversational chatbots, chat interfaces, text boxes, voice interfaces, phone applications, virtual reality interfaces and augmented reality interfaces, to interact with the knowledge seeker. The SLKRS receives queries and feedback from the knowledge seeker and sends experiences to the knowledge seeker through these interfaces. As used herein, an "experience" refers to a digital asset that the SLKRS generates from standard digital assets, for example, text, images, audios, videos, games, virtual reality simulations, and augmented reality simulations. Also, as used herein, a "digital asset" refers to text or media that is formatted into a binary source and includes the right to use it. The SLKRS provides constant and immediate assistance to the knowledge seeker through the interfaces in an interactive manner. The SLKRS regularly gauges learning progress of the knowledge seeker through, for example, assessments, and continually adapts a learning path to make the knowledge seeker proficient in the concepts at the knowledge seeker's own pace. In an embodiment, the SLKRS is always available to the knowledge seeker through an Internet connection.

Figure 1:
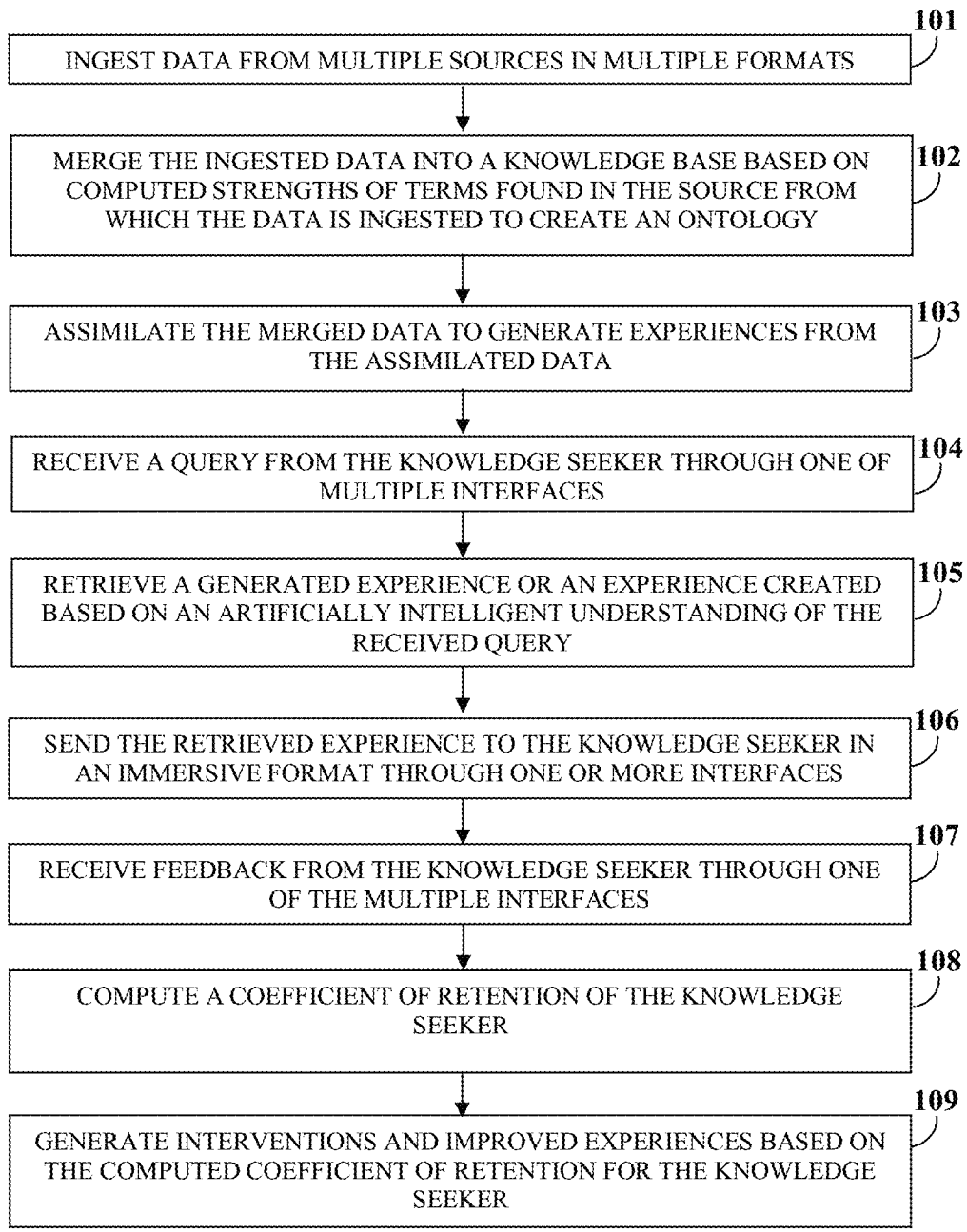
FIG. 1 illustrates a computer-implemented method for providing adaptive and personalized e-learning based on continually, artificially learned unique characteristics of a knowledge seeker.

FIG. 1 illustrates a computer-implemented method for providing adaptive and personalized e-learning based on continually, artificially learned unique characteristics of a knowledge seeker. The smart-learning and knowledge retrieval system (SLKRS) ingests 101 data from multiple sources in multiple formats. The sources and formats comprise the Internet, documents in multiple formats, social media streams, blogs, web pages, videos, audios, images, social media streams like Twitter® and Facebook®, Wikipedia®, games, virtual reality simulations, and augmented reality simulations. The SLKRS merges 102 the ingested data into a knowledge base to create an ontology. The SLKRS takes new information from the ingested data and combines it with existing information in an already created portion of the knowledge base. The SLKRS builds an ontology for a knowledge domain. For example, if the knowledge domain of interest is applied computer science, then for that area, the SLKRS establishes a detailed hierarchy of terms in applied computer science and their relationships. The SLKRS computes strengths of terms found in each of the sources using parameters comprising frequency of occurrence of those terms in other sources, relevance of the terms to an already created portion of the ontology, and inputs from the knowledge seeker. Given one resource in the hierarchy, the SLKRS builds a graph of all related resources to a depth that is predetermined and that can be updated. Through the graph, the SLKRS classifies all ingested data against clusters of resources within the ontology, regardless of data format, based on the strength of the terms found in the data source. The SLKRS also indexes and tags the data source based on the strength of the terms contained in the data source. In an embodiment, the SLKRS assigns weights to the tags for data sources based on the strengths of the terms found in them. In an embodiment, the SLKRS allocates numeric values to the tags and computes the strengths of the terms in a tagged data source as percentile ranks. The SLKRS assigns weights to the tags by multiplying the numeric values with numbers between 0 and 1 based on the percentile ranks indicated by the strengths of the terms in the tagged data source. In an embodiment, the strength of the terms in a data source is indicated by more than one percentile rank to account for the different parameters, namely, the frequency of occurrence of the terms in other sources, relevance of the terms to an already created portion of the ontology, and inputs from the knowledge seeker, based on which the data source is evaluated.

In an embodiment, the smart-learning and knowledge retrieval system (SLKRS) builds a comprehensive ontology, complete with classification and hierarchy, of science, technology, engineering, mathematics and arts, and multidisciplinary subjects. The SLKRS captures the connection and relation between the different disciplines in multidisciplinary subjects to capture context and ensure a smooth transition between concepts without intervening gaps, and how they are connected and related. The ontology created from the merging of the ingested data by the SLKRS allows the SLKRS to retrieve appropriate information in response to a query of a knowledge seeker after applying artificial intelligence and machine learning algorithms. In an embodiment, the SLKRS builds a repository of terms to describe subjects in the fields of science, technology, engineering, mathematics, and arts from a hierarchical approach. The SLKRS uses the built repository to organize the fields of science, technology, engineering, mathematics, and arts into sub areas and further keep drilling down to specific concepts that can be learned by knowledge seekers. So, when the SLKRS has further content from the ingestion, the content can be tagged at the level of the specific concepts and when a knowledge seeker seeks for a piece of knowledge, the hierarchical representation will allow the SLKRS to drill down and retrieve content at various levels. Search and retrieval, classification of content, relationship of one piece of content to another, relative position of content as to whether it is low level and detailed, or it is higher level, etc., become possible with the ontology and classification mechanism of the SLKRS. The SLKRS also uses taxonomy-based classification along with ontology, which is category-based classification. Taxonomy refers to tags which a knowledge seeker can use to search for content or any information. Categorization or ontology-based classification brings rigor and relationships among content and subject areas and organizes the knowledge. The SLKRS implements both taxonomy and category-based classification to provide information and results to knowledge seekers.

The smart-learning and knowledge retrieval system (SLKRS) assimilates 103 the merged data to generate experiences. In the assimilate phase, the SLKRS processes the merged data into knowledge, and executes, via a processor, artificial intelligence and machine learning algorithms to develop a thorough understanding of the merged information. The SLKRS tags standard digital assets, for example, text, images, and video based on relevant terms. The SLKRS generates the experiences as new asset types from existing asset types, for example, videos. The SLKRS builds experiences from existing videos, games, virtual reality simulations, and augmented reality simulations that are immersive in nature. The SLKRS builds the experiences to engage the knowledge seeker in a concept through multiple senses as opposed to just spewing out text. The SLKRS links together all asset types in a huge graph, based on their proximity to weighted tags and search terms that a knowledge seeker might use to search for information in the SLKRS. The SLKRS generates decision trees to be able to parse the assimilated data to build the experiences. A decision tree, analogous to flowcharts, begins at a root node and culminates in a leaf node with a decision. The SLKRS utilizes the decision trees to arrive at decisions in building experiences for the knowledge seekers.

The smart-learning and knowledge retrieval system (SLKRS) receives 104 a query from the knowledge seeker through one of multiple interfaces comprising text boxes, chat interfaces, voice interfaces, phone applications, interactive chat bots, virtual reality interfaces and augmented reality interfaces. The SLKRS comprises a retrieval architecture that occurs as multiple layers. The first layer is a user interaction layer, which provides a uniform interaction to the knowledge seeker, an end user or a querying system, across all channels of interaction to the underlying SLKRS. It is through the user interaction layer that the SLKRS receives the query from the knowledge seeker. The knowledge seeker can choose to interact, for example, via Skype®, Facebook Messenger®, bots, smart phone applications, web applications, application programming interface (API) calls, virtual reality or augmented reality applications, etc. In an embodiment, the SLKRS receives the query through a translate layer comprising text to speech, speech to text, and language translations on receiving a request for the translate layer from the knowledge seeker. The translate layer is a software layer that provides text to speech and speech to text interactions as well as language translations to the request queries. In the embodiment, the SLKRS implements the translate layer for use with all interactions with the knowledge seeker when the knowledge seeker requests for the translate layer from the SLKRS through one of the multiple interfaces.

The smart-learning and knowledge retrieval system (SLKRS) retrieves 105 a generated experience or an experience created based on an artificially intelligent understanding of the received query. In contrast to a simple request and response system that presents several links, pages, images, or videos in response to a request for information, the SLKRS is very specific and generates the most relevant response to the received query. The response is also a very specific and provides the relevant knowledge to address the query. The SLKRS achieves the artificially intelligent understanding of the received query through artificial intelligence and machine learning programs executable by at least one processor configured to execute computer program instructions. The retrieval architecture in the SLKRS comprises a natural language understanding layer as the second layer after the user interaction layer. The SLKRS filters all queries through a natural language understanding layer first. In this layer, the SLKRS understands the query using natural language and determines the specific intent or intents behind the query. The SLKRS also determines entities or concepts of interest based on the received query. The SLKRS then compares the original question in the query against the knowledge base to see if it matches a response pattern. If the SLKRS finds such a direct match, then the SLKRS chooses the result as the response since the question has an exact answer. If there is no exact match determined to the original question, the SLKRS rephrases and simplifies the original question using the intents, the entities, and the concepts discovered by applying natural language understanding. Thereafter, the SLKRS engages the third layer in the retrieval architecture, a pattern recognition layer. The SLKRS checks the new set of simplified and rephrased questions against the knowledge base using pattern recognition. If there is an exact match, the SLKRS chooses the result as the response.

The fourth layer in the retrieval architecture in the smart-learning and knowledge retrieval system (SLKRS) is a natural language processing layer. If the techniques in the second and third layers fail to retrieve a perfect match, then the SLKRS engages the natural language processing layer to determine a close match based on previously trained data and conversations. If the SLKRS finds a result with accuracy and confidence, then the SLKRS chooses that result. If the natural language processing layer fails to provide a response with a predetermined degree of probability, then the SLKRS engages a fifth layer in the retrieval architecture, a multi-learning layer. Using a variety of algorithms that have been trained against models and fine-tuned, the SLKRS addresses the current query and generates a response to the query. The SLKRS processes the query in parallel via decision trees and decision paths, pattern recognition as well as natural language processing, or serially one after the other to see which method of understanding the query is a better option for the query posed. The pre-generated decision trees that the SLKRS possesses after assimilation of the ingested data help the SLKRS process the query. For this, decision trees must exist for that type of query or a sub-domain of the query. The SLKRS can recognize repeating patterns and retrieve responses if a pattern matches exactly, and in the absence of a decision tree being available or pattern matching, can execute natural language processing to predict the query.

The smart-learning and knowledge retrieval system (SLKRS) sends 106 the retrieved experience to the knowledge seeker in an immersive format through one or more of the interfaces for the knowledge seeker to interact with the sent experience. The SLKRS presents an experience that provides the ability to interact in an immersive manner with the response for the knowledge seeker, an end user or a system. The interaction is also possible through a conversational interface like a chat bot or a virtual reality or augmented reality interface. Thus, the end user can traverse the response and understand the response completely.

The smart-learning and knowledge retrieval system (SLKRS) receives 107 feedback from the knowledge seeker through one of the multiple interfaces in response to the sent experience. For responses that the SLKRS generates using the natural language processing or multi-learning techniques, the SLKRS also embeds the response with an option for the knowledge seeker to indicate if the chosen response is accurate or not accurate. This allows the SLKRS to create a feedback loop that allows the SLKRS to contextually determine accuracy with cooperation from the knowledge seeker. Sometimes, the SLKRS determines accuracy from the next thread of conversation from the knowledge seeker where the knowledge seeker may seek additional clarifications or indicate dissatisfaction with the response. The SLKRS uses artificial intelligence and machine learning algorithms to figure out in the order in which a set of topics is presented to the knowledge seeker.

In current learning methods, the table of contents is fixed and so are the curriculum and examples taught to make a student understand a concept. As such, there is no fluidity in the material that a student learns. In contrast, the smart-learning and knowledge retrieval system (SLKRS) provides a learning stream, which is, virtually, a single pane of glass where relevant material fluidly flows in and out of a knowledge seeker's intellectual vision and range. The SLKRS customizes, via artificial intelligence and machine learning algorithms, the learning stream that appears as a single pane of glass for each knowledge seeker based on his or her individual characteristics. Consider, for example, reading a Physics book. As the knowledge seeker is reading a page and looking at a problem, the knowledge seeker might not understand a formula. The knowledge seeker will seek and refer another basic book that may explain the formula. The knowledge seeker may face a problem in understanding the explanation of the formula and may then go online to graph sample results of the formula and look up related information. In another example, the knowledge seeker may have forgotten basic material related to current studies and may look up definitions or class notes. In the learning stream provided by the SLKRS, the knowledge seeker's learning needs are anticipated by the SLKRS and provided right at the juncture where the knowledge seeker seeks additional information. The knowledge seeker does not have to, for example, even go to another webpage. The SLKRS utilizes artificial intelligence and machine learning algorithms, understands the context of the knowledge seeker's current studies, the knowledge seeker's specific problem and brings data the knowledge seeker needs automatically right there to that very screen of a computing device, for example, that the knowledge seeker is using to access the SLKRS.

The smart-learning and knowledge retrieval system (SLKRS) brings relevant information to the knowledge seeker automatically as the SLKRS recognizes the knowledge seeker's specific issue. The SLKRS provides a substantially personalized learning experience and adapts to the knowledge seeker's learning process continuously. The SLKRS adapts content that explains concepts a knowledge seeker is learning, and may provide new content for one knowledge seeker, while for another knowledge seeker learning the same concepts, the SLKRS may provide additional content on the same topics to reinforce the understanding. For yet another knowledge seeker learning the same concepts, the SLKRS may present related content that may have been poorly understood by the knowledge seeker in the past since that related content may be foundational to a current topic, and the issue with the knowledge seeker struggling with the current topic may be due to the knowledge seeker not having understood a prior topic well enough.

The smart-learning and knowledge retrieval system (SLKRS) computes a coefficient of retention 108 for the knowledge seeker based on a test of the ability of the knowledge seeker to recall a concept after the passage of a predetermined length of time and after being exposed to a predetermined number of applications of the concept. The artificial intelligence in the SLKRS takes into account a host of parameters to compute the score and adapt experiences for a knowledge seeker. The SLKRS considers factors comprising attention, motivation, context, gender, age, grade level, and proficiency level to gauge their impact on the performance of the knowledge seeker in an e-learning course. The SLKRS artificially learns the unique characteristics of the knowledge seeker by considering several attributes of the knowledge seeker through the knowledge seeker's interaction with the SLKRS. One such attribute is the coefficient of retention of the knowledge seeker. While knowledge seekers, or students, learn at different rates and this learning efficiency could vary from concept to concept, the coefficient of retention plays a part in student performance on a test. The coefficient of retention refers to the ability of a student to learn a new or related concept, and in general show continued interest in a course.

The inputs to compute the coefficient of retention comprise one or more of the following; time spent on a topic of study, frequency of visit to the topic, time period between visits to the topic, time spent on each visit to the topic, usage patterns of reading material in the topic, performance in tests conducted on the topic, and click pattern while engaging with the topic.

A retention graph of the coefficient of retention is generated to directionally indicate retention of information of the concept by the knowledge seeker. The retention graph depicts points of assessments and observations.

Figure 13:
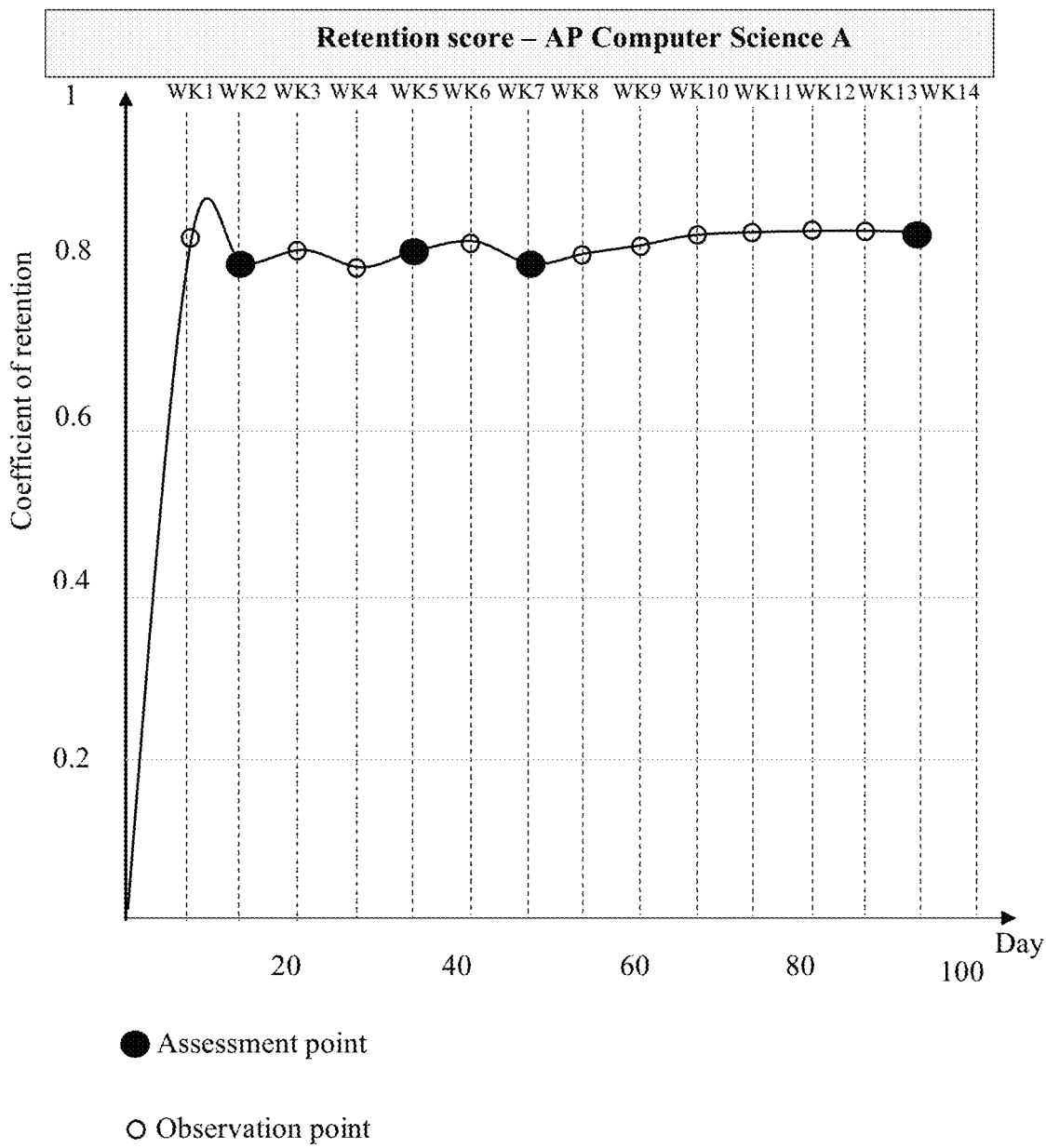
FIG. 13 illustrates a retention graph depicting assessment and observation points.

FIG. 13 illustrates an exemplary retention graph depicting assessment and observation points. It can be inferred from the exemplary retention graph that the knowledge seeker is performing satisfactorily given that coefficient of retention value is approximately 0.8.

A student who attends an e-learning course regularly, and has a high coefficient of retention, will perform well, gain more confidence, and hence will attend the e-learning course more regularly and this cycle continues. A student who is not able to attend regularly might start to do poorly and hence will start to lose interest, which will further affect the interest level of the student in participating further in this course. Aspects of concern in this scenario include identifying the factors that affect interest levels of the student in the e-learning course, keeping interest levels at a certain threshold so that the student is motivated to come back to the course regularly, detecting drops in interest levels and creating interventions at such junctures.

The coefficient of retention, as used herein, is defined as the ability of a student to recall a concept after the passage of a predetermined amount of time and after being exposed to a predetermined number of examples or applications of that concept. The coefficient of retention, rho, for a student is expressed as a function of time spent by the student on a concept, t, and the number of applications of a concept or a set of concepts that the student is exposed to, n, and takes on a value between 0 and 1.

Specifically, rho=f(t, n), wherein rho=coefficient of retention, t=time, n=number of applications of the concept. The number of applications of the concept, denoted by n, is itself a function, and therefore, rho is a composite function of t and n.

The coefficient of retention is computed algorithmically, with the flexibility to define n in any context and to pass that function, n, in addition to t, into the computation of rho, which is a function of t and n. In some implementations, n is determined based on one or more parameters, e.g., a frequency of visiting a concept, time spent by a student on the concept, number of times the same concept was visited by a student during a certain duration, answers provided to any question(s) during the visits by the student that demonstrate a level of learning (grasp), e.g., immediate grasp, no grasp, etc., during the visit, etc.

The smart-learning and knowledge retrieval system (SLKRS) computes rho, the coefficient of retention, for every student. The SLKRS computes the coefficient of retention periodically for every student and once it falls below a predetermined threshold, a student may have to repeat a topic or an entire lesson before being allowed to move on. However, the coefficient of retention is only one of the inputs that the SLKRS uses to personalize the learning path as other measures of evaluation, for example, regular assessments of knowledge acquired and direct feedback from the knowledge seeker, are considered as well. During the knowledge seeker's interaction with the SLKRS, the SLKRS continually assesses and collects metrics based on, for example, clicks on a webpage displayed by the SLKRS on a computing device that the knowledge seekers uses to access the SLKRS. In an example, the SLKRS also continually assesses and collects information on how long the knowledge seeker spends on a screen or frame or digital asset on the display of the computing device, what actions the knowledge seeker takes, whether the knowledge seeker is repeating a topic in an e-learning course, how much time has passed since the knowledge seeker last accessed the particular e-learning course, etc. The SLKRS uses the knowledge seeker's interaction with itself to compute the score for that knowledge seeker.

Another attribute of a knowledge seeker that the smart-learning and knowledge retrieval system (SLKRS) uses to compute the score for the knowledge seeker is time. While some knowledge seekers, or students, learn one concept or lesson at a time, others learn in blocks or move onto new concepts quickly. A student may like to complete lessons and sometimes will move on to more lessons spending hours at a time. On the other hand, another student may complete units of a lesson but not always finish the whole lesson, as the student spends only about half an hour in one sitting. SLKRS considers assessing accuracy as a function of time. For example, if a student spends 7 minutes answering 10 questions on a quiz and scores 9 points, and another student spends 5 minutes answering 10 questions and scores 8 points, theoretically, given that all other conditions remain the same for the two students, the SLKRS considers concluding that the second student could have scored the full 10 points if the second student spent 7 minutes. If one were to take the "score" attribute separately, one might conclude that student 1 did better. But "speed" of answering questions reveals a mastery on a concept and upon watching this attribute closely across several concepts and quizzes, the SLKRS considers if the speed of answering questions is a better predictor of how fast a student might learn a related concept. The second student, who answers questions faster, might need fewer examples and might accelerate learning. The first student is someone who misses very few questions but takes more time to process information. The SLKRS considers whether the first student might need many more examples on the concept the student was tested on and related concepts to be able to understand and progress further. The SLKRS also considers if the situation is related to motivation of the first student. The SLKRS gauges if the second student portrays a tendency to rush if the second student feels very confident about the material and assumes answers, and doesn't read instructions very well leading to mistakes because the second student didn't take time to answer the questions. The first student may not attempt to answer a question unless the first student feels absolutely certain regarding the answer, and may take as much time as the first student needs to answer a question. By considering the time taken by a knowledge seeker to achieve different milestones in an e-learning course, the SLKRS has one way of detecting the mastery of the knowledge seeker.

Yet another attribute that the smart-learning and knowledge retrieval system (SLKRS) considers is experience level. A student may be comfortable with computers if he or she has already done some programming. For example, one student may have played with programming with Raspberry Pi® and Lego® Mindstorms and may enjoy many games like Minecraft® as gleaned by the SLKRS through the interactions of the student with the SLKRS. Another student may show less interest in computer games, only playing something after watching someone else do it first, and then deciding if he or she is interested. As such, a related attribute that the SLKRS considers is confidence level. For example, one student may be very comfortable just jumping right in and learning new concepts. The student may be content to explore and figure things out on his or her own. On the other hand, another may be cautious and worry about doing well showing signs of perfectionism. This student may often ask parents for help. Another attribute is comfort with repetition. For example, while a student likes to do something over and over to feel he or she has mastered it, another student gets bored quickly with repetition.

The smart-learning and knowledge retrieval system (SLKRS) also considers preferences or aptitudes as an attribute. As deliberated on in the study "Development of an Adaptive Learning System with Multiple Perspectives based on Students' Learning Styles and Cognitive Styles" by Tzu-Chi Yang et al., the SLKRS considers cognitive styles and learning styles of the knowledge seekers in computing the score for the knowledge seekers. Cognitive style refers to an innate habitual approach to processing information when engaging in cognitive tasks. Cognitive styles are generally stable and consistent over time. Learning style refers to an innate pattern of thinking, perceiving, problem solving, and remembering when approaching a learning task. A learning style is fairly stable and consistent over time and across a wide variety of learning situations and is regarded as an application of a cognitive style to learning situations. A learning style also refers to a preferred way of learning and concerns how students process information, how they learn and how well they retain information.

The smart-learning and knowledge retrieval system (SLKRS) considers the impact of a learning style to be neutral provided there is no correlation with other attributes because each learning style has its own potential advantages and disadvantages. A certain learning style of a knowledge seeker may help process information according to its relationship to the individual. Learning styles are not fixed and change based on tasks or situations. Multiple classifications of learning styles have been proposed over the last fifty years. Some of them include visual, auditory, and tactile learning styles, global and analytic learning styles, and inductive and deductive learning styles. There is, however, a debate as to whether teaching a preferred style enhances learning and leads to better outcomes. The validity of the impact of instruction geared towards identified learner styles ranges from undetermined to questionable to low. Researchers cannot consistently replicate and validate an interaction between a learner's style and specific instructional methods, most likely due to variables within learner and/or instructional environments. Research, as found in "The Learning Styles and the Preferred Teaching-Learning Strategies of First Year Medical Students" by Kharb et. al., "Learning styles and pedagogy in post-16 learning" by Coffield et. al., and "Visual, Auditory, Kinesthetic and Multimodal Learning" by University of Arkansas, Fort Smith, has explored learning styles. The research concludes that self-expressed preferred styles do not match performance, and that most learners are multi-modal, multi-situational, and adopt corresponding strategies for learning. People do not learn the same way and learning preferences are real, but it is not always appropriate to reduce to dichotomous groups. Learning styles are not mutually exclusive categories but preferences may be mild, moderate, or strong. There are innumerable individual variations when prior knowledge, experience, and skill level are factored into the learning style equation. Research also concludes that the point is not to match teaching styles to learning styles but rather to achieve balance, making sure that each style preference is addressed to a reasonable extent during instruction. Dr. Richard M. Felder opines that "learning styles provide no indication of what the students are and are not capable of, nor are they legitimate excuses for poor academic performance." Students may have a learning preference, but that is not the only way they can learn, nor should it be the only way they are taught.

The smart-learning and knowledge retrieval system (SLKRS) takes into account learning styles through characteristics learned from the knowledge seeker. It gauges if the knowledge seeker listens to and shares ideas with other knowledge seekers engaging with the SLKRS. The knowledge seeker may perceive concretely and process reflectively and reflect on problems alone than brainstorm with others. The knowledge seeker may view experiences from many perspectives, being insightful and personally involved in his or her own learning as opposed to being a passive recipient of instruction. The knowledge seeker may be goal-oriented, solitary, and logical. The knowledge seeker may perceive abstractly and process reflectively, forming theories from concepts and previous observations. A knowledge seeker may think sequentially. A knowledge seeker may be actively involved in learning, thriving during manipulation of objects or when presented with problem to be solved, loving challenges. A knowledge seeker may be suited to active field study and excel in hands-on problem solving. A knowledge seeker may show a tendency to act without consulting others. A knowledge seeker may be interested in self-discovery as identified based on the interaction with the SLKRS. A knowledge seeker may be stimulating, impulsive, enthusiastic, and intuitive, avoiding isolation and seeking to energize others. A knowledge seeker may take on too much and not complete tasks. The SLKRS adapts the experiences and interventions it generates for a knowledge seeker based on such artificially learned unique characteristics of the knowledge seeker.

The smart-learning and knowledge retrieval system (SLKRS) also considers multiple intelligences portrayed by a knowledge seeker in his or her approach in tackling a concept. Not everyone is smart in the same way; everyone possesses different faculties but to different degrees. The table below illustrates the characteristics of different intelligences and consequences of possessing them to a high degree.

| Intelligence | Characteristics | Consequences |
| --- | --- | --- |
| Verbal-linguistic | facility in producing language | favor using computer technology and entering into discussions |
| Musical | sensitivity to components of music and emotional implications | study by listening to recordings related to topics |
| Logic-Mathematical | reasoning deductively or inductively, and recognizing and manipulate abstract relationships | prefer classifying, sequencing, and solving problems |
| Spatial | creating visual representations of world and transfering them mentally or concretely | like to observe, imagine, and solve spatial problems |
| Kinesthetic | use of body to solve problems, making things, conveying ideas and emotions | excel with manipulatives and prefer to participate actively |
| Interpersonal | working effectively with others and understanding their emotions, goals, and intentions | like to work in groups and discuss with others |
| Intrapersonal | understanding own emotions, goals, and intentions | like to work independently |
| Naturalistic | capacity to recognize and make distinctions in the natural world and use the ability productively | see patterns and like to identify a problem and research solutions |

Knowledge seekers benefit from following a specific learning strategy, namely, a chosen plan of action of how to approach a given learning task. A knowledge seeker may deploy a learning strategy based on the nature of a task, prior experience, and motivation. Knowledge seekers are usually conscious of these strategies that they use. Knowledge seekers also have learning preferences, namely, expressed personal preferences favoring a type of learning environment and a method of instruction. For example, a learning preference may involve a preference for group or independent study. Knowledge seekers also possess learner aptitudes, namely, special innate capacities that give rise to competencies in dealing with specific types of content.

Furthermore, the smart-learning and knowledge retrieval system (SLKRS) considers other concepts of learning in computing the score for the knowledge seeker. Knowledge seekers could follow a holistic learning approach, or an analytic learning approach. This pertains to the manner in which individuals process information either as a whole, or broken down into separate parts. Holists require explicit structure and guidance, external motivation, and social interaction. Some evidence points to holists being better in web-based learning environments that provide better structure and global perspective prior to deeper content exploration and benefitting more from social interactions. Analytics are internally directed, generate their own structure, and require less external motivation and support. Some evidence points to analytics performing better in web-based learning environments that are less structured and promote in-depth content exploration prior to presenting overviews.

Furthermore, the smart-learning and knowledge retrieval system (SLKRS) focuses on other learner characteristics. Prior knowledge is indisputably the biggest factor in predicting a learner's initial success in almost every learning situation. Also, highly motivated learners will learn just about anything despite instructional design and excel when instructional resources are readily available. Another characteristic of relevance is perceived self-efficacy: if cognitive resources are consumed with managing negative states associated with a task, learning will be negatively impacted. Anxiety, fear of failure, prior experiences with task or content to be learned, perceived difficulty of a task and other psychological factors also affect the learning outcomes in an e-learning course.

The smart-learning and knowledge retrieval system (SLKRS) also computes a knowledge concept graph for the knowledge seeker to define understanding and mastery over concepts in an e-learning course. Knowledge concept graphs can replace other measures of evaluation, for example, a cumulative grade point average (CGPA), of the knowledge seekers performance in the e-learning course. Starting from a high level of the knowledge concept graph, one can drill down to particular subjects or concepts and sub-concepts to gauge the mastery of the knowledge seeker in the particular concepts within the e-learning course. Hence, the subjects can be interdisciplinary and still its understanding evaluated using the knowledge concept graphs. Moreover, the SLKRS computes a knowledge concept graph in real-time deriving the same based on multiple underlying algorithms. In an embodiment, the SLKRS builds a knowledge concept graph that has nodes and edges. The SLKRS builds this knowledge concept graph for each e-learning course that a knowledge seeker undertakes. In the embodiment, the SLKRS also aggregates and cumulatively starts developing a knowledge concept graph that shows dots and connectors that, for example, look like synapses and neurons. In the embodiment, the dots, which represent concepts, are color coded to show mastery of concepts or no knowledge of concepts or anything in between. In the embodiment, the sizes of the dots show amount of knowledge around the corresponding concept. The connectors show which concepts are related. The thickness of the connectors show how strong the bonds are for a knowledge seeker between the dots, that is, concepts, that the connector connects. As such, over time, the SLKRS pictures, via artificial intelligence and machine learning algorithms, how these various interconnected concepts are working within a knowledge seeker's brain and also how these concepts strengthen or weaken over time. The SLKRS, via the knowledge concept graph, develops a unique cognitive blueprint for each knowledge seeker.

The cognitive blueprint of a knowledge seeker captures the interconnection of concepts, and the mastery or level of expertise of the knowledge seeker on a concept, for example, by assigning a score on each node of the knowledge concept graph where each node represents a concept and a leaf node represents a granular concept or a sub-concept of a parent concept. The smart-learning and knowledge retrieval system (SLKRS) uses knowledge concept graphs to provide personalized learning paths. The SLKRS combines knowledge concept graphs with an identified learning style of the knowledge seeker to curate information related to concepts in an e-learning course that the knowledge seeker undertakes. The SLKRS also uses the knowledge concept graphs to bring additional examples, content, and interventions to improve learning outcomes of the knowledge seeker.

The smart-learning and knowledge retrieval system (SLKRS) uses the score and the artificial understanding of direct feedback from the knowledge seeker to tailor the immersive experiences that the SLKRS generates for the knowledge seeker. The SLKRS considers association similar to the theory of classical conditioning by the Russian physiologist Ivan Pavlov, and broaching related concepts and related examples to help the knowledge seeker better understand the context of the concept to be learned. Through the computation of the score and corresponding application of artificial intelligence, the SLKRS therefore artificially learns unique characteristics of the knowledge seeker for measuring an ability of the knowledge seeker to learn and to show continued interest in an e-learning course. The SLKRS generates 109 interventions and improved experiences to provide adaptive and personalized e-learning to the knowledge seeker based on the computed score for the knowledge seeker.

The smart-learning and knowledge retrieval system (SLKRS) provides analytics for assessment of a knowledge seeker's progress and social interaction among stakeholders. In an embodiment where the SLKRS is used by students, the SLKRS provides two types of groups—a student group and a friend circle. Parents, teachers, and students have their own logins, and each have a different type of landing page on a website. Parents and teachers have the ability to register, create a group or groups, buy subscriptions or courses, and assign students to the groups and subscriptions purchased. In the embodiment, each student in a particular group needs to have the same subscription, for example, subscription number 2, which could be for students in grades 2 to 4. Individual courses which are premium or free courses can be added to any subscription. Students can also browse through courses or subscriptions, but instead of a "Buy" button, they will have a "Share" button on their webpages for them to share the course or subscription with their parents for the parents to review and buy for them. In embodiment, parents, teachers and students have access to analytics, but what they see will differ based on role. Students can only see their own performance and analytics data. Teachers can see the data for the entire group of students they have added to a group. Parents also can see the analytics data for their own children.

In an embodiment, the other type of group that the smart-learning and knowledge retrieval system (SLKRS) provides is the friend circle. The friend circle concept is only for students. Each student can have a friend circle where the student can add a few select friends who are also on the smart-learning and knowledge retrieval system (SLKRS) as current students. Once friends are part of a friend circle, they will be able to share certain things within the circle and can stop sharing also at any time. So, students can be part of any group(s) where they were added by a parent or a teacher to the group(s), but a friend circle is created by the student. This creates a social aspect to SLKRS and promotes virality. Students can also invite other friends who are not on SLKRS. Parents can also send an invite to other parents to join the SLKRS. The SLKRS also provides forums to allow students to post questions and obtain answers from participants at large—parents, teachers and other students. The SLKRS offers incentivization for participation in the forums. Both posting questions and answers will result in points that can be applied to prizes later. In an embodiment, a user interface for a student comprises a "share with friend" option—for a student who is older, and say, uses social media. They could use the share with a friend option to encourage their friend to try a class or with those they are friends with on Facebook; this can even be used to recruit people to be in their friend circle.

The smart-learning and knowledge retrieval system (SLKRS) ensures security of all communication and storage of data. The SLKRS handles sensitive information, for example, login credentials of knowledge seekers and other stakeholders including parents, teachers, and users in an enterprise that uses the SLKRS, analytics, information of unique characteristics of knowledge seekers, etc. When the various modules, services, or components of the SLKRS communicate within the SLKRS, and when the SLKRS communicates with third party services, knowledge seekers and other stakeholders, the SLKRS uses security measures. The SLKRS ensures security of information through software mechanisms, for example, data encryption, data masking, etc., and also through hardware mechanisms, especially when enterprises are involved, for example, biometric security, disk encryption, etc. The SLKRS uses administration policies to prevent data theft, safeguard copyright, and ensure privacy for all the stakeholders.

Figure 2:
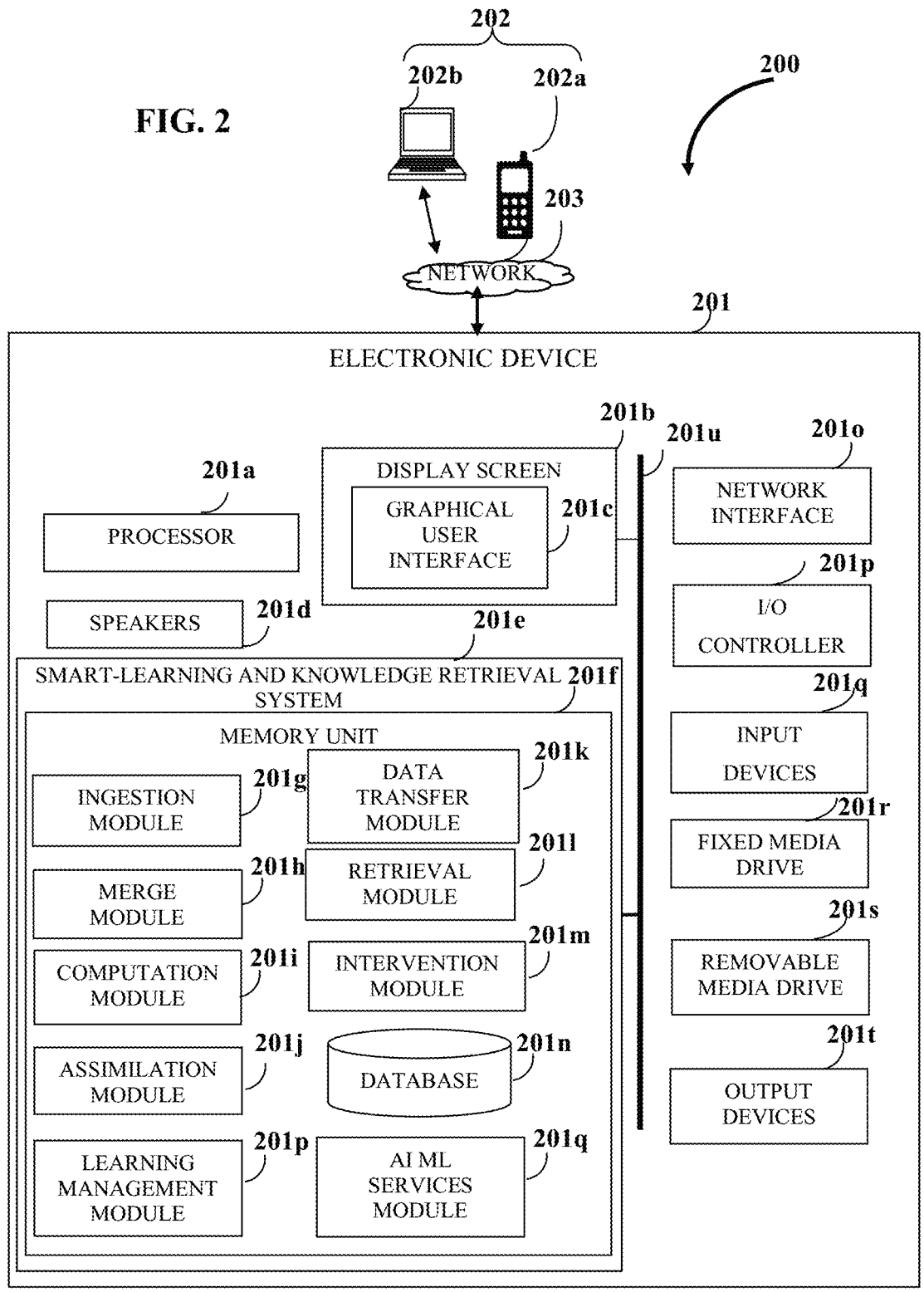
FIG. 2 exemplarily illustrates a system comprising the smart-learning and knowledge retrieval system for providing adaptive and personalized e-learning based on continually, artificially learned unique characteristics of a knowledge seeker.

FIG. 2 exemplarily illustrates a system 200 comprising the smart-learning and knowledge retrieval system (SLKRS) 201e implemented on an electronic device 201 for providing adaptive and personalized e-learning based on continually, artificially learned unique characteristics of a knowledge seeker. In an embodiment, the SLKRS 201e uses programmed and purposeful hardware. The SLKRS 201e is implemented on an electronic device 201, for example, a personal computer, a tablet computing device, a mobile computer, a portable computing device, a laptop, a touch device, a workstation, a server, portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc., with one or more servers associated with one or more online services.

The smart-learning and knowledge retrieval system (SLKRS) 201e communicates with client devices 202 exemplarily shown as a mobile phone 202a or a personal computer 202b accessed by the knowledge seeker through a network 203. The network 203 is, for example, one of the internet, an intranet, a wired network, a wireless network, a communication network that implements Bluetooth® of Bluetooth Sig, Inc., a network that implements Wi-Fi® of Wi-Fi Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, etc., a local area network, a wide area network, an internet connection network, an infrared communication network, etc., or a network formed from any combination of these networks. The network 203 can be a wired, a wireless, or a combination of networks using different protocols. In an embodiment, the smart-learning and knowledge retrieval system (SLKRS) 201e is accessible to the client devices 202, for example, through a broad spectrum of technologies and devices such as cellular phones, tablet computing devices, etc., with access to the internet.

The smart-learning and knowledge retrieval system (SLKRS) 201e communicates with client devices 202 via the network 203, for example, a short range network or a long range network. The client devices 202 comprising, as exemplarily shown 202a or 202b, are electronic devices, for example, personal computers, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, client devices, portable electronic devices, network enabled computing devices, interactive network enabled communication devices, any other suitable computing equipment, combinations of multiple pieces of computing equipment, etc. In an embodiment, the client devices 202 are hybrid computing devices that combine the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities.

As exemplarily illustrated in FIG. 2, the smart-learning and knowledge retrieval system (SLKRS) 201e comprises a non-transitory computer readable storage medium, for example, a memory unit 201f for storing programs and data, and at least one processor 201a communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 201d. The non-transitory computer readable storage medium is configured to store computer program instructions defined by modules, for example, 201g, 201h, 201i, 201j, 201k, etc., of the SLKRS 201e. The modules 201g, 201h, 201i, 201j, 201k, 201l, and 201m are installed and stored in the memory unit 201f of the SLKRS 201e. The memory unit 201f is used for storing program instructions, applications, and data. The memory unit 201f is, for example, a random access memory (RAM) or another type of dynamic storage device that stores information and instructions for execution by the processor 201a. The memory unit 201f also stores temporary variables and other intermediate information used during execution of the instructions by the processor 201a. The SLKRS 201e further comprises a read only memory (ROM) or another type of static storage device that stores static information and instructions for the processor 201a.

The processor 201a is configured to execute the computer program instructions defined by the modules, for example, 201g, 201h, 201i, 201j, 201k, etc., of the smart-learning and knowledge retrieval system (SLKRS) 201e. The processor 201a refers to any of one or more microprocessors, central processing unit (CPU) devices, finite state machines, computers, microcontrollers, digital signal processors, logic, logic devices, user circuits, application specific integrated circuits (ASIC), field-programmable gate arrays (FPGA), chips, etc., or any combination thereof, capable of executing computer programs or a series of commands, instructions, or state transitions. In an embodiment, the processor 201a is implemented as a processor set comprising, for example, programmed microprocessors and math or graphics co-processors. The processor 201a is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The SLKRS 201e disclosed herein is not limited to employing a processor 201a. In an embodiment, the SLKRS 201e employs controllers or microcontrollers.

As exemplarily illustrated in FIG. 2, the electronic device 201 comprising the smart-learning and knowledge retrieval system (SLKRS) 201e further comprises a data bus 201u, a network interface 201o, an input/output (I/O) controller 201p, input devices 201q, a fixed media drive 201r such as a hard drive, a removable media drive 201s for receiving removable media, output devices 201t, etc. The data bus 201u permits communications between the modules, for example, 201g, 201h, 201i, 201j, 201k, etc., of the SLKRS 201e and other components of the electronic device 201. The network interface 201o enables connection of the SLKRS 201e to the network 203. In an embodiment, the network interface 201o is provided as an interface card, also referred to as a line card. The network interface 201o comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, radio frequency (RF) technology, near field communication, etc. The I/O controller 201r controls input actions and output actions performed by the SLKRS 201e.

The display screen 201b, via the graphical user interface (GUI) 201c, displays content of files, display interfaces, user interface elements such as chat windows, etc. The display screen 201b is, for example, a video display, a liquid crystal display, a plasma display, an organic light emitting diode (OLED) based display, etc. The smart-learning and knowledge retrieval system (SLKRS) 201e provides the GUI 201c on the display screen 201b. The GUI 201c is, for example, an online web interface, a web based downloadable application interface, a mobile based downloadable application interface, etc. The display screen 201b displays the GUI 201c. The input devices 201q are used for inputting data into the SLKRS 201e for routine maintenance of the SLKRS 201e. The input devices 201q are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 201t output the results of operations performed by the SLKRS 201e.

The processor 201a is configured to execute computer program instructions defined by modules of the smart-learning and knowledge retrieval system (SLKRS) 201e. The modules of the SLKRS 201e comprise an ingestion module 201g, a merge module 201h, a computation module 201i, an assimilation module 201j, a data transfer module 201k, a retrieval module 201l, and an intervention module 201m, learning management module 201p and AI ML services module 201q. The learning management module 201p consists of several functions provided to deliver eLearning courses in multiple content formats, immersive learning environments to learn emerging STEM fields, ability to write code and test code, assessments, reporting, user management, subscriber management, ability for parents, students, and educators to access the system, community and collaboration. The AI ML module 201q consists of AI algorithms that are available on-demand and in batch mode and can be invoked via micro services, http endpoints, or by any other means a user requests access to the AI algorithms included and provided access to a user or an external system or external service. Knowledge Concept Graph Retention, Alternate Learning Path, Survival Analysis, Optimum Learning Time, Learning Loss Computation, and many other AI ML algorithms are available under the AI ML services module. The ingestion module 201g ingests data from multiple sources in multiple formats. The multiple sources in multiple formats comprise the Internet, documents in a plurality of formats, social media streams, blogs, web pages, videos, audios, and images. The merge module 201h merges the ingested data into a knowledge base to create an ontology. The ingested data is merged into the knowledge base based on strengths of terms found in the sources from which the data is ingested, where the strengths of the terms are computed by the computation module 201i. The merge module 201h indexes and tags the sources from which the data is ingested based on the computed strengths of terms found in the sources. The assimilation module 201j assimilates the merged data to generate experiences from the assimilated data. The data transfer module 201k receives a query from a knowledge seeker through one of multiple interfaces via the graphical user interface (GUI) 201c on the electronic device 201. The multiple interfaces comprise text boxes, chat interfaces, voice interfaces, phone applications, interactive chat bots, virtual reality interfaces and augmented reality interfaces. The retrieval module 201l retrieves a generated experience or an experience created based on an artificially intelligent understanding of the received query. The retrieval module 201l achieves artificially intelligent understanding of the received query through artificial intelligence and machine learning programs that are executable by the processor 201a. The data transfer module 201k sends the retrieved experience to the knowledge seeker in an immersive format via one or more of the multiple interfaces for the knowledge seeker to interact with the sent experience. The data transfer module 201k also receives feedback from the knowledge seeker via the one of the interfaces in response to the sent experience. The data transfer module receives the query and the feedback from the knowledge seeker, and sends the retrieved experience to the knowledge seeker through a translate layer comprising text to speech, speech to text, and language translations on receiving a request for the translate layer from the knowledge seeker. The translate layer is disclosed in the detailed description of FIG. 1.

The computation module 201i of the smart-learning and knowledge retrieval system (SLKRS) 201e computes the strengths of the terms found in each source using parameters comprising frequency of occurrence of the terms in the other plurality of sources, relevance of the terms to a created portion of the ontology, and the queries and the feedback received from the knowledge seeker. The computation module 201i computes a score for the knowledge seeker continually based on the received query and the received feedback, thereby artificially learning unique characteristics of the knowledge seeker for measuring an ability of the knowledge seeker to learn and to show continued interest in an e-learning course. The computation module 201i computes a coefficient of retention for the knowledge seeker based on a test of the ability of the knowledge seeker to recall a concept after the passage of a predetermined length of time and after being exposed to a predetermined number of applications of that concept. The computation module 201i computes a knowledge concept graph for the knowledge seeker to define understanding and mastery over concepts in the e-learning course. The intervention module 201m generates interventions and improved experiences to provide adaptive and personalized e-learning to the knowledge seeker based on the score for the knowledge seeker computed by the computation module 201i.

The database 201o and the one or more client databases 201h of the smart-learning and knowledge retrieval system (SLKRS) 201e can be any storage areas or media that can be used for storing data and files. In an embodiment, the SLKRS 201e stores the received feedback in external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the database 201o and the one or more client databases 201h can be locations on a file system. In another embodiment, the database 201o and the one or more client databases 201h can be remotely accessed by the SLKRS 201e via the network 203. In another embodiment, the database 201o and the one or more client databases 201h are configured as cloud-based databases implemented in a cloud computing environment, where computing resources are delivered as a service over the network 203.

Computer applications and programs are used for operating the modules of the smart-learning and knowledge retrieval system (SLKRS) 201e. The programs are loaded onto the fixed media drive 201r and into the memory unit 201f of the SLKRS 201e via the removable media drive 201s. In an embodiment, the computer applications and programs are loaded directly on the SLKRS 201e via the network 203. The processor 201a executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The SLKRS 201e employs the operating system for performing multiple tasks. The operating system is responsible for management and coordination of activities and sharing of resources of the SLKRS 201e. The operating system further manages security of the SLKRS 201e, peripheral devices connected to the SLKRS 201e, and network connections. The operating system employed on the SLKRS 201e recognizes, for example, inputs provided by a user of the SLKRS 201e using one of the input devices 201q, the output devices 201t, files, and directories stored locally on the fixed media drive 201r. The operating system on the SLKRS 201e executes different programs using the processor 201a. The processor 201a and the operating system together define a computer platform for which application programs in high level programming languages are written.

The processor 201a retrieves instructions defined by the ingestion module 201g, the merge module 201h, the computation module 201i, the assimilation module 201j, the data transfer module 201k, the retrieval module 201l, and the intervention module 201m for performing respective functions disclosed above. The processor 201a retrieves instructions for executing the modules, for example, 201g, 201h, 201i, 201j, 201k, etc., of the smart-learning and knowledge retrieval system (SLKRS) 201e from the memory unit 201f. A program counter determines the location of the instructions in the memory unit 201f. The program counter stores a number that identifies the current position in the program of each of the modules, for example, 201g, 201h, 201i, 201j, 201k, etc., of the SLKRS 201e. The instructions fetched by the processor 201a from the memory unit 201f after being processed are decoded. The instructions are stored in an instruction register in the processor 201a. After processing and decoding, the processor 201a executes the instructions, thereby performing one or more processes defined by those instructions.

At the time of execution, the instructions stored in the instruction register are examined to determine the operations to be performed. The processor 201a then performs the specified operations. The operations comprise arithmetic operations and logic operations. The operating system performs multiple routines for performing a number of tasks required to assign the input devices 201q, the output devices 201t, and the memory unit 201f for execution of the modules, for example, 201g, 201h, 201i, 201j, 201k, etc., of the smart-learning and knowledge retrieval system (SLKRS) 201e. The tasks performed by the operating system comprise, for example, assigning memory to the modules, for example, 201g, 201h, 201i, 201j, 201k, etc., of the SLKRS 201e and to data used by the SLKRS 201e, moving data between the memory unit 201f and disk units, and handling input/output operations. The operating system performs the tasks on request by the operations and after performing the tasks, the operating system transfers the execution control back to the processor 201a. The processor 201a continues the execution to obtain one or more outputs. The outputs of the execution of the modules, for example, 201g, 201h, 201i, 201j, 201k, etc., of the SLKRS 201e are displayed to a user of the SLKRS 201e on the output device 201t.

In an embodiment, one or more portions of the SLKRS 201e are distributed across one or more computer systems (not shown) coupled to the network 203. While the SLKRS 201e presents a seamless experience to a knowledge seeker interacting with the SLKRS 201e, the database 201o, of the SLKRS 201e, is spread over multiple computer systems located at various locations globally, as a distributed database, for quicker and smoother access by knowledge seekers situated at different geographical locations. In another embodiment, the database 201o is implemented as a graph database with nodes for data and relationships indicating association between the data in various nodes of the graph database. In another embodiment, the database 201o utilizes features of different database systems, for example, relational databases and graph databases.

The non-transitory computer readable storage medium disclosed herein stores computer program codes comprising instructions executable by at least one processor 201a for providing adaptive and personalized e-learning based on continually artificially learned unique characteristics of a knowledge seeker. The computer program codes comprise a first computer program code for ingesting data from multiple sources in multiple formats; a second computer program code for merging the ingested data into a knowledge base to create an ontology, where the ingested data is merged into the knowledge base based on computed strengths of terms found in the sources from which the data is ingested; a third computer program code for assimilating the merged data to generate experiences from the assimilated data; a fourth computer program code for receiving a query from a knowledge seeker through one of multiple interfaces; a fifth computer program code for retrieving a generated experience or an experience created based on an artificially intelligent understanding of the received query; a sixth computer program code for sending the retrieved experience to the knowledge seeker in an immersive format through one or more of the interfaces for the knowledge seeker to interact with the sent experience; a seventh computer program code for receiving feedback from the knowledge seeker through one of the interfaces in response to the sent experience; an eight computer program code for computing a score for the knowledge seeker continually based on the received query and the received feedback, thereby artificially learning unique characteristics of the knowledge seeker for measuring an ability of the knowledge seeker to learn and to show continued interest in an e-learning course; and a ninth computer program code for generating interventions and improved experiences to provide adaptive and personalized e-learning to the knowledge seeker based on the computed score for the knowledge seeker.

The computer program codes further comprise one or more additional computer program codes for performing additional steps that may be required and contemplated for providing adaptive and personalized e-learning based on continually artificially learned unique characteristics of a knowledge seeker. In an embodiment, a single piece of computer program code comprising computer executable instructions performs one or more steps of the method disclosed herein for providing adaptive and personalized e-learning based on continually artificially learned unique characteristics of a knowledge seeker. The computer program codes comprising computer executable instructions are embodied on the non-transitory computer readable storage medium. The processor 201a retrieves these computer executable instructions and executes them. When the computer executable instructions are executed by the processor 201a, the computer executable instructions cause the processor 201a to perform the steps of the method for of the processing computer server 201c.

Figure 3:
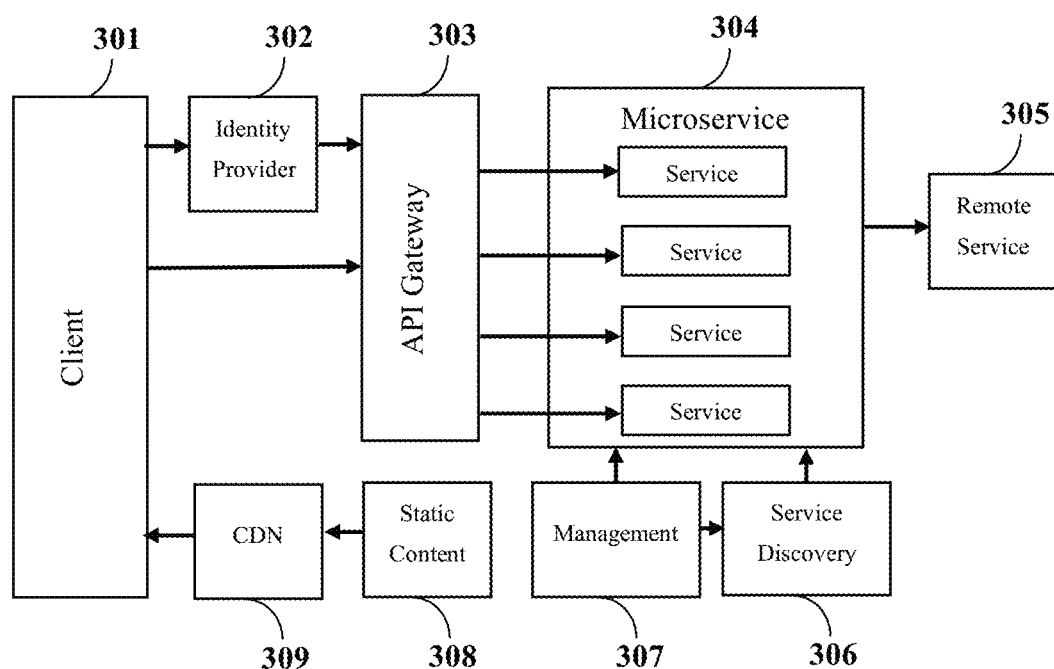
FIG. 3 exemplarily illustrates a microservice architecture that the smart-learning and knowledge retrieval system utilizes for providing microservices to knowledge seekers.

FIG. 3 exemplarily illustrates a microservice architecture that the smart-learning and knowledge retrieval system (SLKRS) 201e utilizes for providing microservices to knowledge seekers. In the microservice architecture, the individual functionalities of the SLKRS 201e are clearly delineated and modularized into individual services called microservices 304. Such modularity enables independent development, deployment, troubleshooting, and scaling of the different services 304. This is in contrast to a traditional programming model involving a monolithic architecture where elements of a software program are interwoven and interdependent. The client 301 refers to a browser, application, device, etc., of a knowledge seeker who registers and once registered signs into an account in the SLKRS 201e. The sign in process of the client 301 and subsequent user authentication to make sure the client 301 requesting access to the SLKRS 201e is indeed representing the knowledge seeker who had registered using the concerned sign in information is done by an identity provider 302. The identity provider 302 is a system that manages identity information of clients including registration, authentication, and management, for example, changing a password, handling forgotten passwords, etc. The application programming interface (API) gateway 303 handles requests from clients 301 for access of services 304 of the SLKRS 201e. The API gateway 303 is the interface between the client 301 and the services 304 of the SLKRS 201e, and routes a request from the client 301 to one or more services 304 as required with necessary translation between protocols, for example, REST, SOAP, JSON, XML, or between any other protocol used by a webpage or application that the client 301 uses to access the SLKRS 201e and an internal protocol the SLKRS 201e uses for its services 304. The client 301 will be able to directly access some of the services 304 through the API gateway 303 and will need to be authenticated first through the identity provider 302 to access some other services 304 that need a login. The services 304 themselves comprise concept mastery assessments, social interaction, dictionary, jokes and quotes, trivia, etc., that the SLKRS 201e offers to the client 301 after logging in to the SLKRS 201e. The remote service 305 is a process that dwells away from the application server comprising the instance of the SLKRS 201e under consideration and which provides a service, for example, a web service or a caching service, to the SLKRS 201e.

In the microservice architecture illustrated in FIG. 3, service discovery 306 refers to the detection of network locations of instances of services that, for example, have dynamically assigned network locations or are situated on different servers. The smart-learning and knowledge retrieval system (SLKRS) 201e, in an embodiment, uses servers that are located at different geographical locations and that have cached instances of services and content to enable faster access of the services and content for knowledge seekers located at different geographical locations. The management 307 module handles the management of the services 304 and their application components. For example, management involves access management of the services 304 based on the type of client 301, for example, a student, parent, or a teacher accessing the services. The management 307 module can also configure the services 304 in real time and manage a lifecycle of the services including, for example, auto-scaling, namely creating more instances of the services 304 in response to increased demand, and auto-healing, namely recognizing and reestablishing failed instances of the services 304. Static content 308 comprises digital assets and information that is ingested, merged, and assimilated by the SLKRS 201e. The content delivery network (CDN) 309 is a network of distributed servers that are located at different geographic locations to provide quicker responses to clients 301 located at or near those geographic locations.

Figure 4:
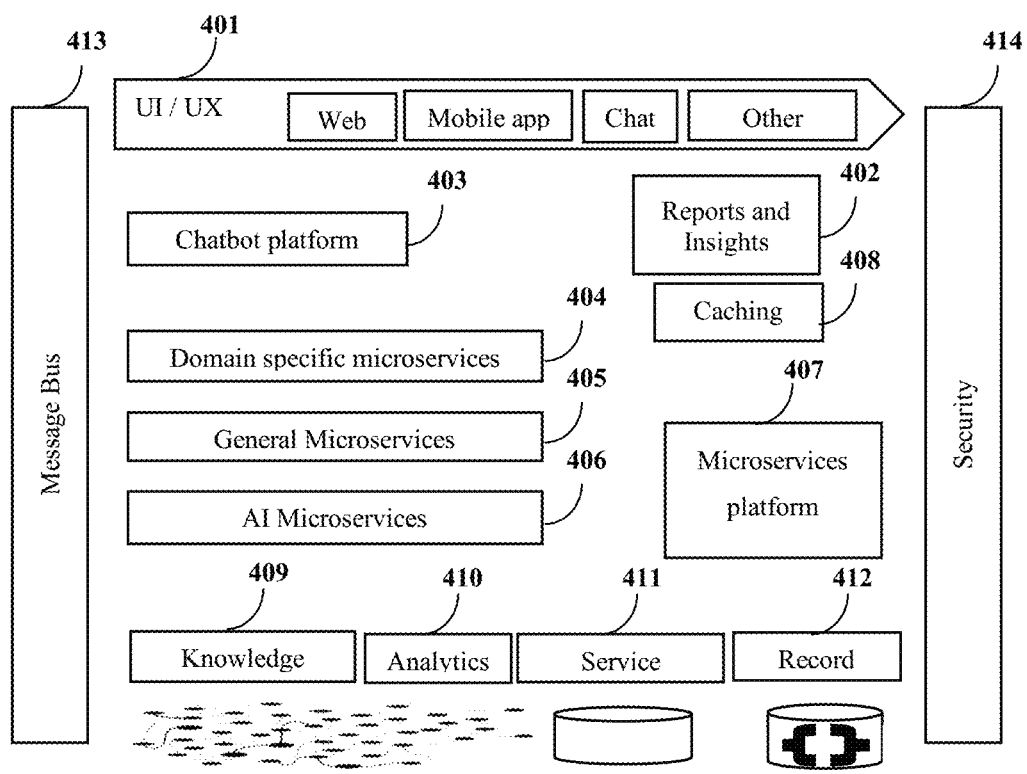
FIG. 4 exemplarily illustrates a block diagram of an artificial intelligence microservices platform of the smart-learning and knowledge retrieval system.

FIG. 4 exemplarily illustrates a block diagram of an artificial intelligence microservices platform of the smart-learning and knowledge retrieval system (SLKRS) 201e. A knowledge seeker, that is a client 301 as illustrated in FIG. 3 can access the SLKRS 201e through a user interface (UI) or user experience (UX) portal 401 comprising multiple interfaces, for example, a web portal, a mobile application, a chat interface, etc. as disclosed in the detailed description of FIG. 1. Reports and insights 402 are informational data comprising specific data from the artificially learned unique characteristics of the knowledge seeker that the SLKRS 201e uses for measuring an ability of the knowledge seeker to learn and to show continued interest in an e-learning course. The SLKRS 201e makes available to the knowledge seeker, the specific data that shows the progress of the knowledge seeker in the e-learning course, and insights that the knowledge seeker may draw on for improvement and greater self-awareness in learning. The chatbot platform 403 is a software platform that receives queries and feedback from the knowledge seeker and provides responses including experiences to the knowledge seeker based on an artificially intelligent understanding of the received query, through a translate layer if requested by the knowledge seeker, as disclosed in the detailed description of FIG. 1. Domain specific microservices 404 are microservices that have clearly delineated boundaries and defined contexts with their own requirements and criteria segregating them from other microservices that the SLKRS 201e might invoke for multiple requirements. For example, self-service for a client 301 as illustrated in FIG. 3, involving identity management is a context that can be separated from other requirements of the SLKRS 201e. The domain specific microservices 404 could be created jointly with an enterprise using the SLKRS 201e to cater to specific requirements of the enterprise above and beyond the services offered by the SLKRS 201e. The SLKRS 201e can also include legacy applications and services of the enterprise when they are transformed to microservices. General microservices 405 and artificial intelligence (AI) microservices 406 are the microservices that the SLKRS 201e provides to knowledge seekers apart from the domain specific microservices 404. The microservices platform 407 is an environment comprising program code that the microservices run in. The microservices platform 407 underlies the programs constituting the microservices and provides the necessary functionalities that are used to build the microservices. Caching 408 comprises duplication of data and instances of the microservices for speedier access of the data and microservices by different components of the SLKRS 201e to provide the microservices to the knowledge seeker.

Knowledge graphs 409 are the knowledge concept graphs that the smart-learning and knowledge retrieval system (SLKRS) 201e computes for a knowledge seeker to define his or her understanding and mastery over concepts in an e-learning course as disclosed in the detailed description of FIG. 1. Analytics 410 refers to the information that the SLKRS 201e derives from a systematic analysis of results of assessments and progress of a knowledge seeker through the e-learning course and statistics related to the same. The service database 411 comprises the persistent data that microservices store for their operations. Different microservices may have different data storage requirements, for example, a relational database for some microservices and a NoSQL database for some others. Moreover, modularity of microservices is best served when a database of a microservice is accessible only by that microservice. As such, multiple databases are stored in the service database 411 to cater to the data storage needs of the different microservices. The record store 412 is a data storage repository for storing the records of the knowledge seekers for deriving the analytics 410 and for the knowledge seekers to keep a record of their learning endeavors. The message bus 413 is a common interface with a common set of commands and data representation that enables seamless communication between the different components of the SLKRS 201e. Security 414 is an integral part of all communication within and outside the SLKRS 201e as disclosed in the detailed description of FIG. 1.

Figure 5:
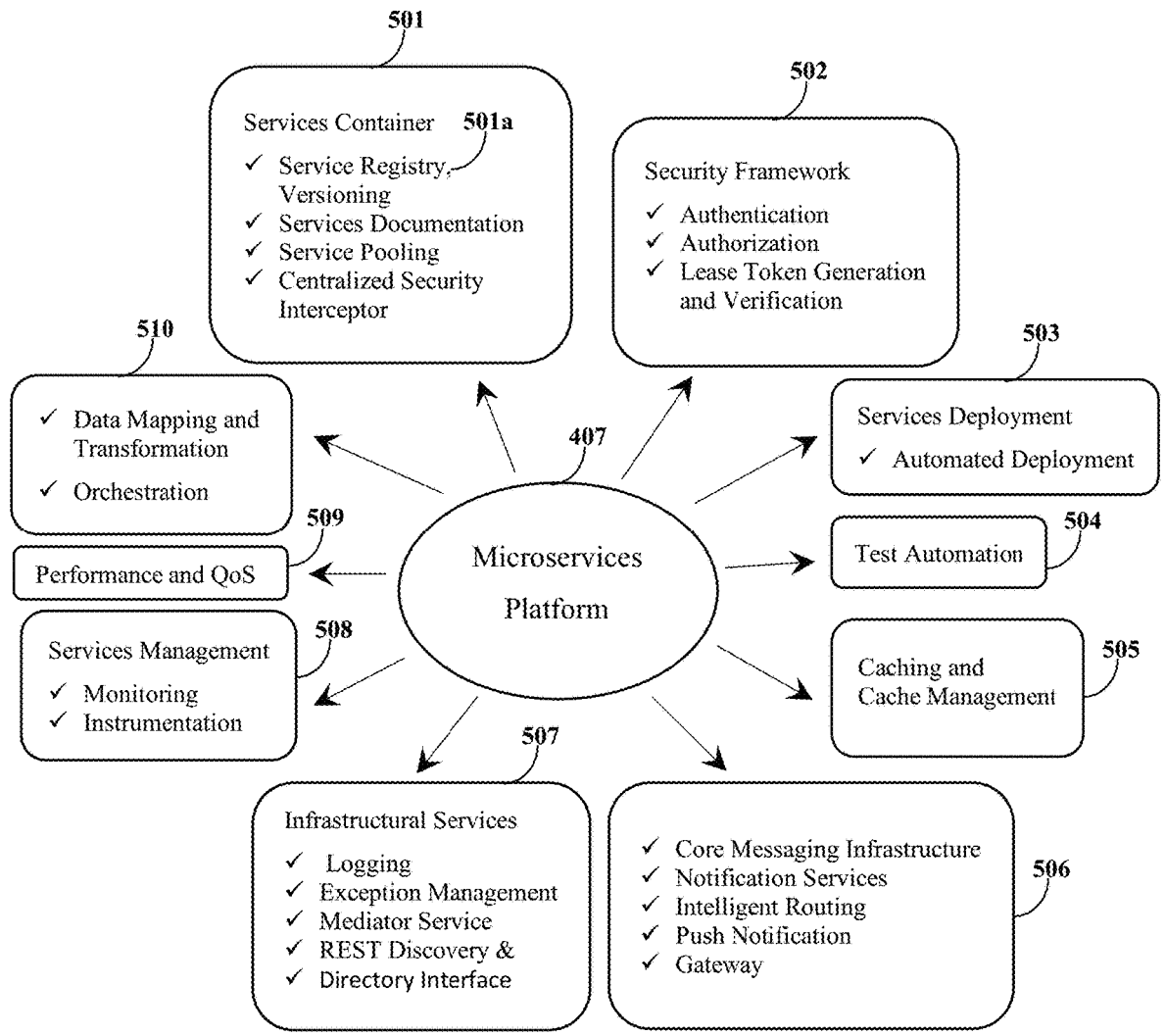
FIG. 5 exemplarily illustrates the internals of the microservices platform of the smart-learning and knowledge retrieval system.

FIG. 5 exemplarily illustrates the internals of the microservices platform of the smart-learning and knowledge retrieval system (SLKRS) 201e. The microservices platform 407 in FIG. 5 refers to the microservices platform 407 disclosed in the detailed description of FIG. 4. The microservices platform 407 encompasses management, maintenance, security, testing, and deployment of services, and communication between the services and with other components, for example, databases and API gateway, of the SLKRS 201e. The services container 501 holds the services and is implemented, for example, as an array object comprising the services. The services container 501 comprises a registry with versioning of the services, documentation pertaining to the services, pooling of services to be called upon for a task, and ensuring security of data and access pertaining to each service through a centralized security interceptor when multiple services are called upon by tasks set in motion through requests to the SLKRS 201e by a knowledge seeker. The security framework 502 deals with authentication of users of the SLKRS 201e, namely the knowledge seekers, authorization of access to services and data, and the corresponding generation and verification of lease tokens granting the access. Services deployment 503 handles the automated deployment of services to be ready to run on servers after the services are updated or modified. Test automation 504 concerns automation of the testing of services at various points and raising of flags when some test cases return unexpected results on running the services. Caching and cache management 505 refers to the duplication of data at different points in the SLKRS 201e including various instances of the services to ensure speedy access to data. Core messaging infrastructure 506 handles messaging between the services and communication with the API gateway 303 exemplarily illustrated in FIG. 3 and includes notification services, intelligent routing of data, and push notifications ensuring automatic updates on changes. In an embodiment, the core messaging infrastructure 506 is an asynchronous messaging system, wherein the services do not have to wait for immediate responses from the recipient of their sent messages and can complete messaging process through a one-way communication. The messaging infrastructure 506 delivers the responses to the sender of the initial messages when available from the recipient.

Infrastructural services 507, as exemplarily illustrated in FIG. 5, concerns maintenance of the infrastructure of the services platform 501 and comprises logging of events, for example, access requests, and management of exceptions or errors as and when they arise, mediation between services, for example, when more than one service requests resources or common data. Infrastructural services 507 also comprise representational state transfer (REST) discovery to capture traffic from, to, and between services conforming to the constraints set by the REST architecture from a browser or a software client accessing the services and a directory interface enabling accessing data and resources through a name look up. Services management 508 concerns monitoring and instrumentation of the services on the service platform 501 to measure performance, monitor execution, and diagnose errors in the running of the services. Performance and quality of service 509 ensures best performance and user experience when accessing the services over the Internet or an intranet by minimizing non-essential interactions with and between services that might hinder optimal network performance. The services platform 501 also comprises data mapping, data transformation, and orchestration 510. Data mapping and transformation ensures compatibility of data between services and between the services platform 501 and the client 301 exemplarily illustrated in FIG. 3. This includes, for example, correlating sensitive data between masked data received from the client 301 via the identity provider 302 and the API gateway 303 exemplarily illustrated in FIG. 3 with a database entry of a service. Orchestration refers to the coordination and management of data and resources to align with the performance and quality of service 509.

Figure 6:
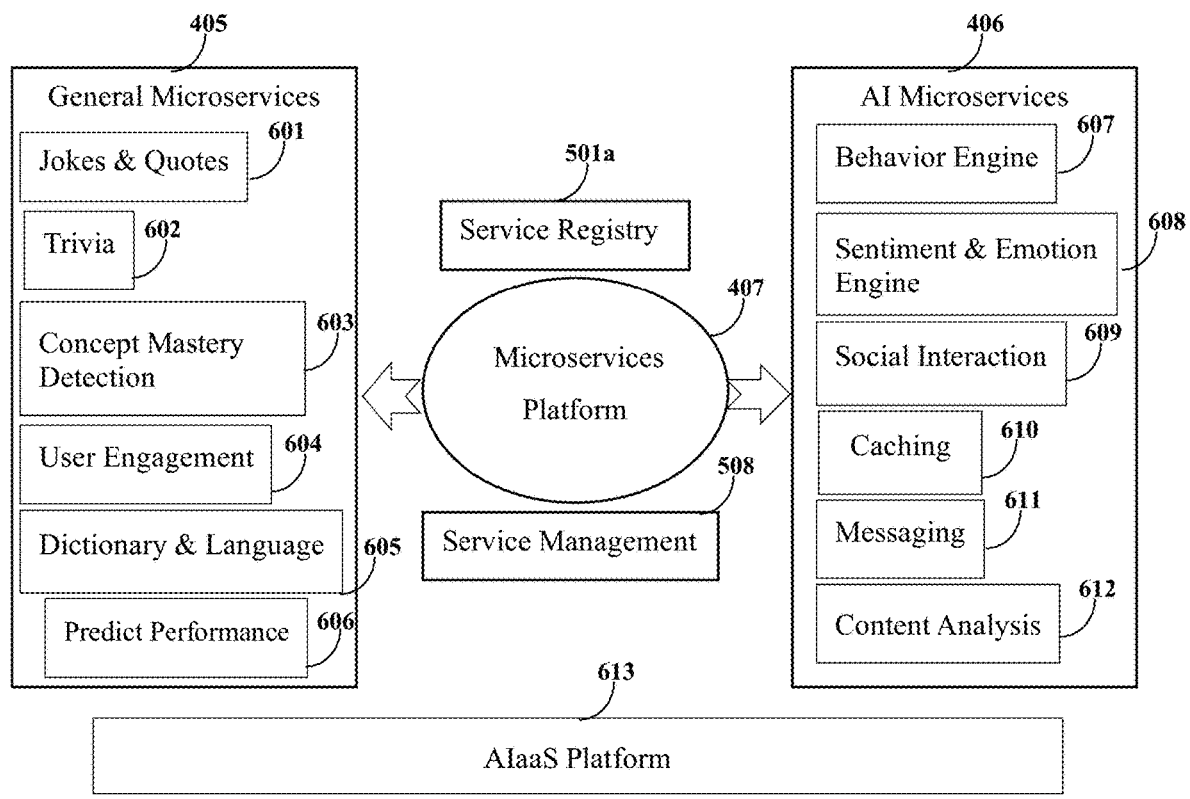
FIG. 6 exemplarily illustrates an example of the microservices that the smart-learning and knowledge retrieval system provides to knowledge seekers.

FIG. 6 exemplarily illustrates an example of the microservices that the smart-learning and knowledge retrieval system SLKRS 201e provides to knowledge seekers. The microservices platform 407 in FIG. 6 refers to the microservices platform 407 disclosed in the detailed description of FIG. 4. FIG. 6 illustrates examples of the general microservices 405 and artificial intelligence (AI) microservices 406 exemplarily illustrated in FIG. 4. Service registry, as depicted under service container 501 in FIG. 5, and service management 508 are as disclosed in the detailed description of FIG. 5. General microservices 405 comprise jokes and quotes 601 and trivia 602 to refresh and motivate the knowledge seekers. Concept mastery detection 603 corresponds to regular assessments of the knowledge seekers' understanding of concepts in an e-learning course. User engagement 604 refers to the engagement of the knowledge seekers in the e-learning course. The SLKRS 201e generates interventions to maintain interest levels of the knowledge seekers to ensure their optimum performance in learning. The SLKRS 201e also provides dictionary and language 605 support to ensure knowledge seekers are supported regardless of the language they speak, except maybe in the case of esoteric languages. The SLKRS 201e also provides predict performance 606 microservices to predict the performance of the knowledge seekers to provide an insight into their projected learning path should they proceed in the same manner as they are at the time. The artificial intelligence services 406 comprise a behavior engine 607 and a sentiment and emotion engine 608 that use machine learning and artificial intelligence algorithms to analyze the knowledge seekers' learning characteristics. The SLKRS 201e uses the outputs of the behavior engine 607 and the sentiment and emotion engine 608 to measure an ability of each knowledge seeker to learn and to show continued interest in an e-learning course. The SLKRS 201e generates interventions and improved experience for the knowledge seekers using the outputs of the behavior engine 607 and the sentiment and emotion engine 608. The social interaction service 609 handles interaction among knowledge seekers or students and all stakeholders comprising parents and teachers as well. In an embodiment, the social interaction service 609 also links to social media websites, for example, Twitter® and Facebook®, to allow seamless interaction between the stakeholders through the SLKRS 201e and social media websites. The caching service 610 caches or duplicates storage of data at convenient memory locations on the electronic device to allow speedier access to the data by the components of the SLKRS 201e. The messaging service 611 handles messages that the SLKRS 201e sends to a knowledge seeker by way of interventions and feedback that the knowledge seeker gives to the SLKRS 201e. The content analysis service 612 analyzes e-learning content assimilated by the SLKRS 201e and responses of the knowledge seeker to assessments in light of any feedback from the knowledge seeker that the messaging service 611 receives to enable the SLKRS 201e to provide improved experiences to the knowledge seeker. The artificial intelligence as a service (AIaaS) platform 613 offers the general microservices 405 and artificial intelligence (AI) 406 microservices to the other components of the SLKRS 201e for using those services to provide adaptive and personalized e-learning to the knowledge seekers. In an embodiment, the AIaaS platform 613 is available to an enterprise that uses the SLKRS 201e for e-learning. In the embodiment, the enterprise can use the AIaaS platform 613 of the SLKRS 201e to run or refine its legacy applications and services, and also to offer new customized services to its clients.

Figure 7:
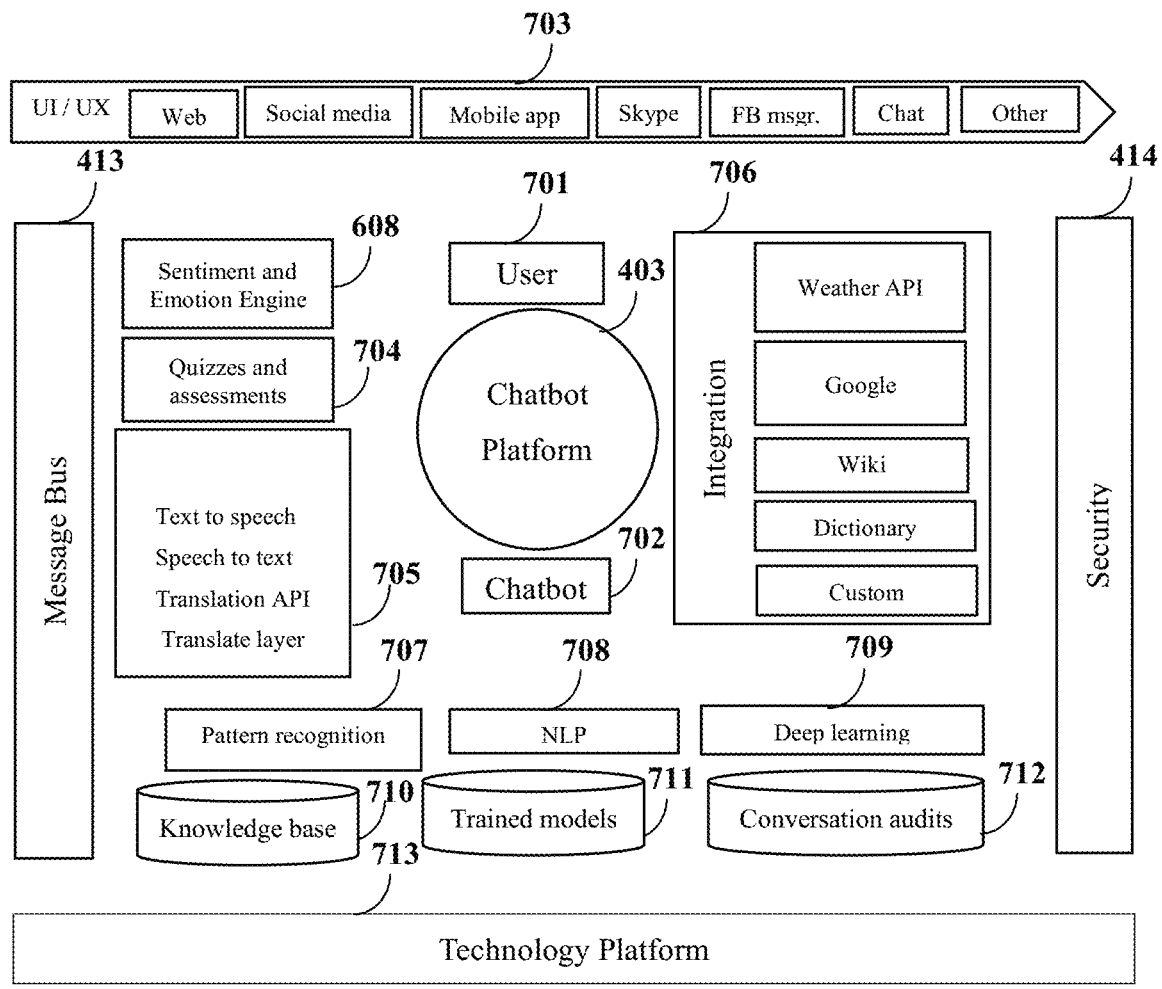
FIG. 7 exemplarily illustrates a chatbot platform as an example of an interface that the smart-learning and knowledge retrieval system provides to knowledge seekers for their interaction with the smart-learning and knowledge retrieval system.

FIG. 7 exemplarily illustrates a chatbot platform as an example of an interface that the smart-learning and knowledge retrieval system (SLKRS) 201e provides to knowledge seekers for their interaction with the smart-learning and knowledge retrieval system. The chatbot platform 403 is part of the microservices platform 407 disclosed in the detailed description of FIG. 4. The chatbot platform 403 provides interaction between a user 701, who is a knowledge seeker, a parent, a teacher, or another stakeholder, for example, a user in an enterprise using the SLKRS 201e, and a chatbot 702. The chatbot platform 407 allows multiple channels of engagement 703 comprising, for example, the World Wide Web, social media, mobile applications, Skype®, Facebook Messenger®, chat programs, etc., for the knowledge seekers and stakeholders to interact with the SLKRS 201e. The sentiment and emotion engine 608 is disclosed in the detailed description of FIG. 6. The chatbot platform 403 provides quizzes and assessments 704 related to the e-learning course to the knowledge seekers. These assessments are interactive in nature compared to plain assignments or tests that students take up in a course. The chatbot platform 403 sources the quizzes and assessments 704 from the microservices platform 407 through the concept mastery detection 603 service under general microservices 405 as disclosed in the detailed descriptions of FIG. 4 and FIG. 6.

The chatbot platform 403 also comprises the translate layer 705 disclosed in the detailed description of FIG. 1. The translate layer comprises text to speech and speech to text services, and a translation application programming interface (API), which provides translation services when requested by other services of the smart-learning and knowledge retrieval system (SLKRS) 201e and ultimately by a knowledge seeker. The chatbot platform 403 integrates third-party services, for example, weather API, Google® search, Wikipedia®, dictionary services, and other custom services, into its responses to the user and queries from the user through the integration module 706. For example, the chatbot platform 403 can pull up relevant information pertaining to a query of a knowledge seeker from the third-party services in addition to the experiences from the assimilated knowledge that the SLKRS 201e provides to the knowledge seeker. The chatbot platform 403 comprises a pattern recognition module 707, a natural language processing (NLP) module 708, and a deep learning module 709 that correspond to the third, fourth, and fifth layers of the retrieval architecture of the SLKRS 201e as disclosed in the retrieval step of the detailed description of FIG. 1. As disclosed in the detailed description of FIG. 1, the pattern recognition module 707 checks simplified and rephrased questions against a knowledge base 710 using pattern recognition, and the NLP module 708 utilizes trained models 711 to determine a close match for a query received from a knowledge seeker. The deep learning module 709 corresponds to the multi-learning layer disclosed in the detailed description of FIG. 1, and uses conversation audits 712 to train artificial intelligence and machine learning algorithms, and fine-tunes the algorithms to generate an appropriate response to the query of the knowledge seeker. As disclosed in the detailed description of FIG. 1, a query passes through a natural understanding layer, then the pattern recognition module 707, then the NLP module 708, and finally the deep learning module 709 only when a suitable response to a query is not available through a previous module. If the query is answered using the pattern recognition module 707, then the query is not seen by the NLP module 708 or the deep learning module 709.

The chatbot platform 403 ensures security 414, as disclosed in the detailed description of FIG. 4, for communication with other components of the smart-learning and knowledge retrieval system (SLKRS) 201e, communication with the third party services via the integration module, and communication with the user 701. The chatbot platform 403 also uses the message bus 413 to communicate with other components, for example, the microservices platform 407, of the SLKRS 201e. The SLKRS 201e makes the functionality of the chatbot platform 403 available, for example, to an enterprise that uses the SLKRS 201e, to allow users of the chatbot platform 403 to incorporate its functionality in their legacy software or as part of their offerings to their customers similar to the AIaaS platform 613 disclosed in the detailed description of FIG. 6. The SLKRS 201e accomplishes the offering of the chatbot platform's 403 functionality through a technology platform 713 providing its functionality as a substratum for other applications to build on.

Figure 8:
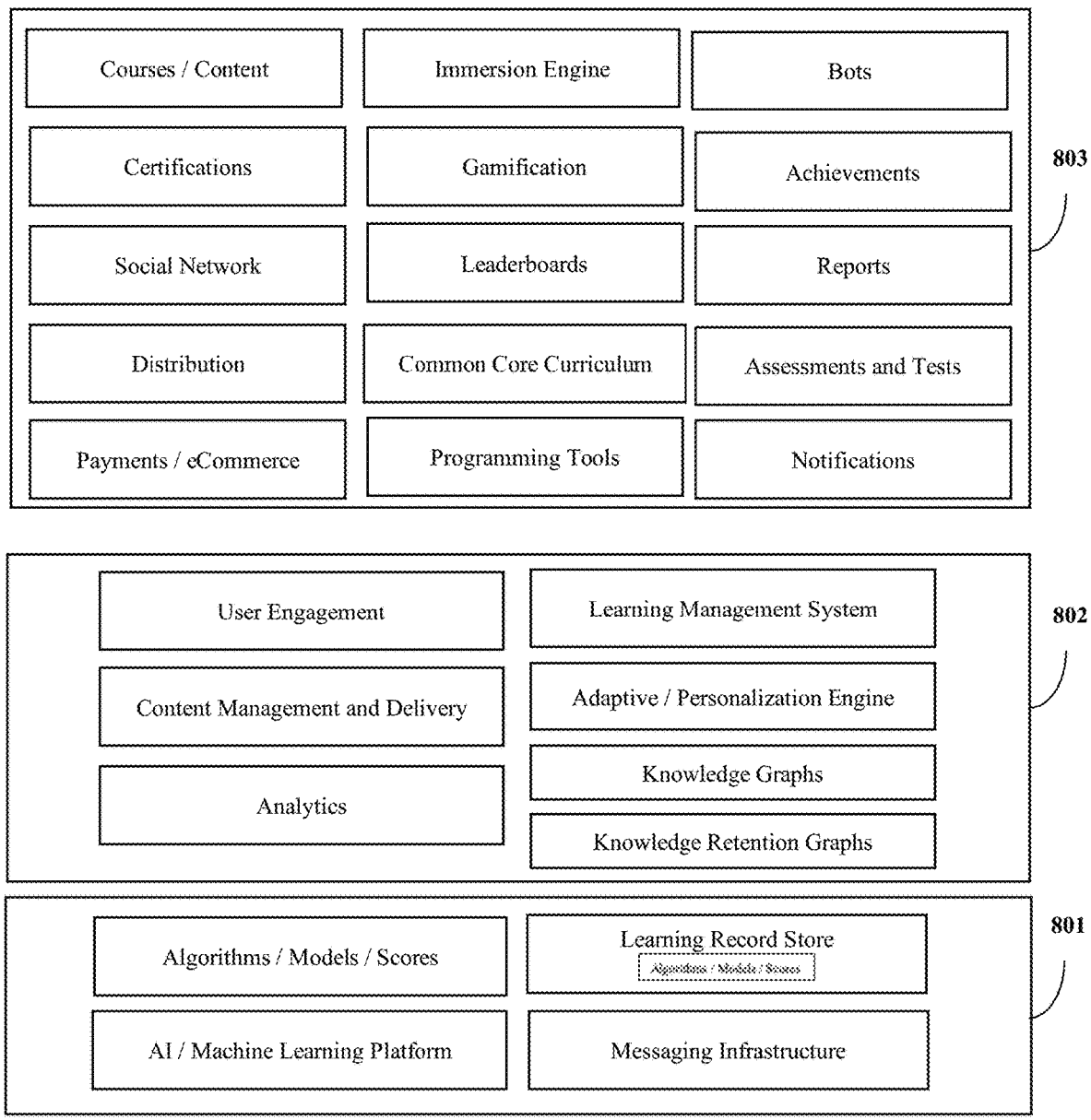
FIG. 8 exemplarily illustrates a software model for the smart-learning and knowledge retrieval system.

FIG. 8 exemplarily illustrates a software model for the smart-learning and knowledge retrieval system (SLKRS) 201e. The software model comprises a base layer 801, an intermediate layer 802, and an upper layer 803. The base layer 801 comprises an artificial intelligence and machine learning platform with corresponding algorithms, machine learning models, and scores used by the algorithms to make artificially intelligent decisions based on queries and feedback received from knowledge seekers interacting with the SLKRS 201e. The base layer 801 also comprises a learning record store, which is a repository for learning records of the knowledge seekers using the SLKRS 201e, and a messaging infrastructure that the SLKRS 201e uses to interact with the knowledge seekers and to enable interaction among the knowledge seekers and stakeholders of the SLKRS 201e including an enterprise using the SLKRS 201e. The intermediate layer 802 provides the ability to engage with the client 301, manage content and delivery, perform analytics, adapt to the client's requirements and learning capability, and generate knowledge graphs. The intermediate layer 802 further comprises a learning management system (LMS) that the SLKRS 201e uses to administer e-learning courses to knowledge seekers, track their progress, and document their progress in the e-learning courses. The intermediate layer 802 further comprises analytics for assessment of a knowledge seeker's progress in an e-learning course, including the creation of a knowledge retention graph. The upper layer 803 comprises the features that the SLKRS 201e implements via the base layer 801 and the intermediate 802 to provide to the knowledge seekers and the stakeholders of the SLKRS 201e. As exemplarily illustrated, some non-limiting examples of the features include course content, certifications, payment platforms, social network, curriculum, bots, reports, assessments and tests and important notifications. To elaborate further, in one embodiment, the client 301, disclosed in the detailed description of FIG. 3, will be able to access all the details of all the knowledge seekers' courses including course material, curriculum, and certifications. In another embodiment, the client 301 has access to social media platforms related to discussion on the courses among various stakeholders. As an example, the client 301 has access to reports and assessments of the SLKRS 201e. In another example, the e-learning platform enables knowledge seekers to make payments for their courses.

Figure 9:
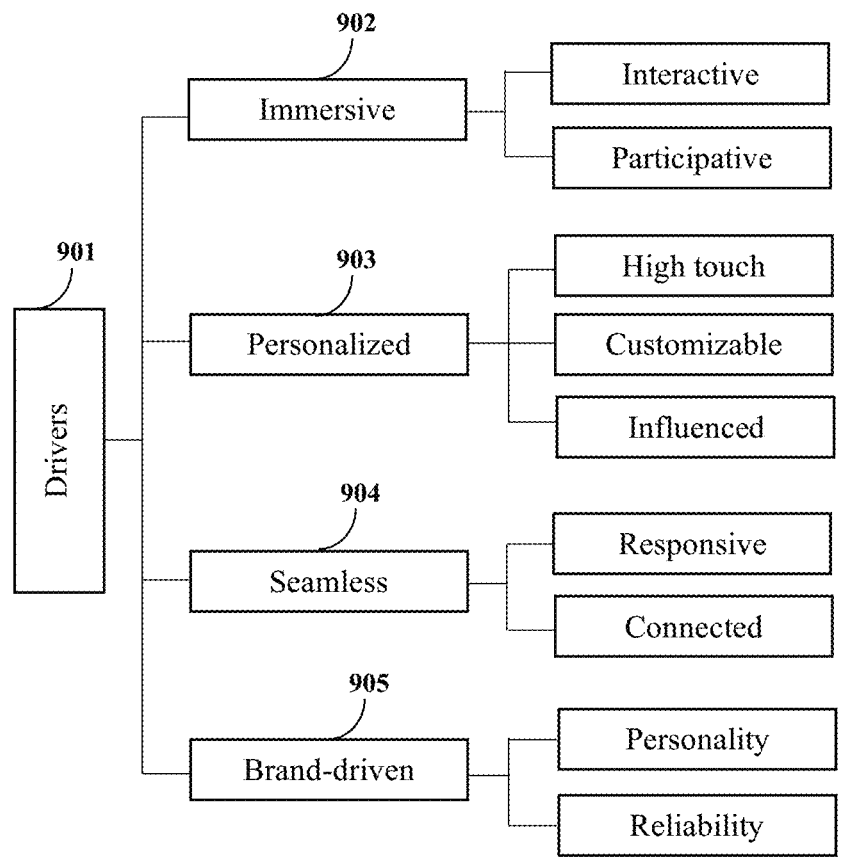
FIG. 9 is a block diagram representation of core strategy and drivers or functional enablers to ensure optimal user experience for a knowledge seeker seeking knowledge on the smart-learning and knowledge retrieval system.

FIG. 9 is a block diagram representation of core strategy and drivers or functional enablers 901 to ensure optimal user experience for a knowledge seeker seeking knowledge on the smart-learning and knowledge retrieval system (SLKRS) 201e. Among the functional enablers or drivers of the SLKRS 201e, the first enabler 902 is being immersive which implies interactive and participative features. Such features encourage and include rich user interactions, viral ability, rich visualizations, crowd sourcing questions and involve social media. The second enabler 903 is about providing a personalized experience and includes having high touch, customizable, and influential features. Such features comprise providing real time responses, having the option of preference settings, and a personalization engine. A third enabler 904 provides a seamless user experience and involves being responsive and connected. Such a requirement comprises having adaptive content, a target channel, social sharing capabilities, and community links. Finally, a fourth enabler 905 is being brand driven, which refers to the personality and reliability of the platform. These comprise branding, providing interactive chatbots and characters, an interaction patterns library that captures patterns in interaction between knowledge seekers and the SLKRS 201e, and using reusable communication templates that are immediately recognizable as being part of the SLKRS 201e.

Figure 10:
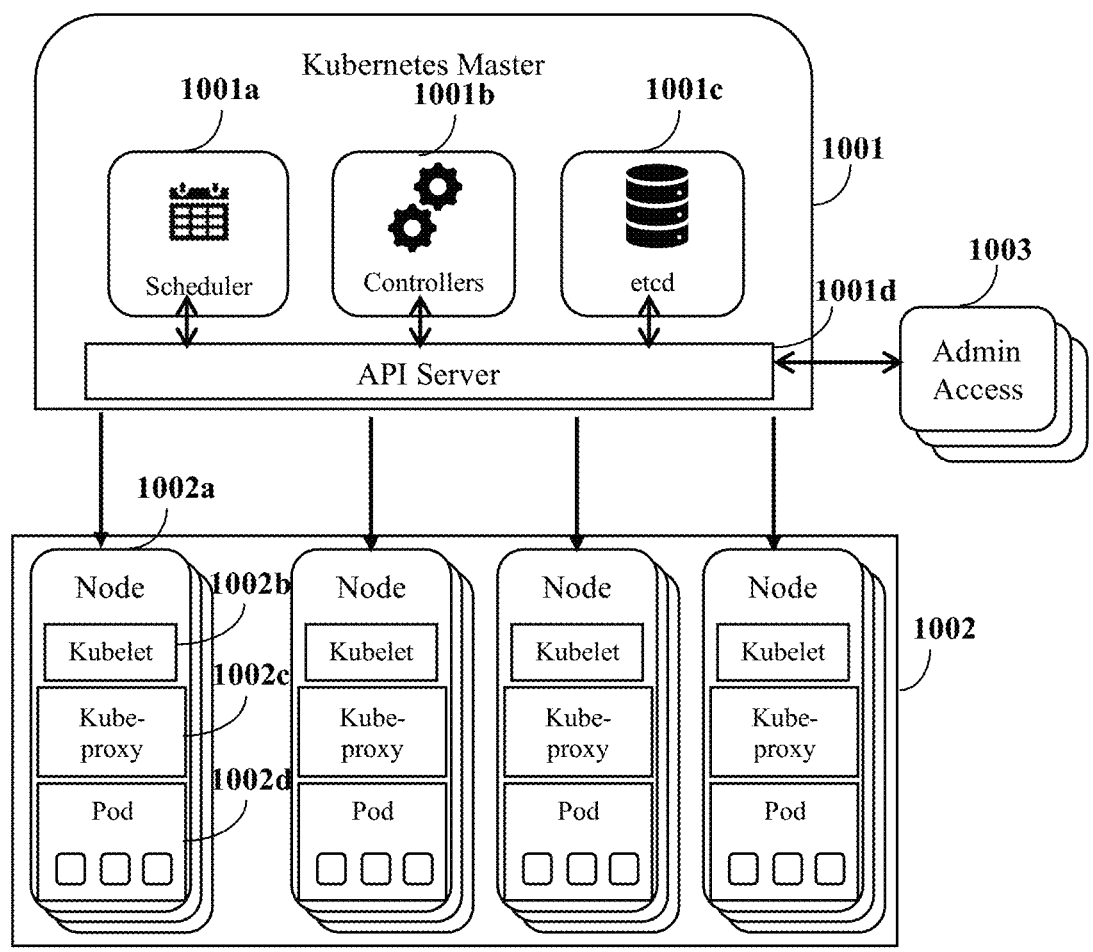
FIG. 10 exemplarily illustrates an architecture for the deployment, scaling, and management of the smart-learning and knowledge retrieval system.

FIG. 10 exemplarily illustrates an architecture for the deployment, scaling, and management of the smart-learning and knowledge retrieval system (SLKRS) 201e. The SLKRS 201e can be deployed, scaled, and managed using a Kubernetes architecture as the SLKRS 201e uses microservices, which lend themselves to containerization and scalability. Kubernetes manages compute, network, and storage resources to meet the demand. The Kubernetes master 1001, a set a processes, ensures the resources are available to the microservices of the SLKRS 201e. The Kubernetes master 1001 comprises a scheduler 1001a, controllers 1001b, etcd 1001c, and an application programming interface (API) server 1001d. The Kubernetes cluster of machines or virtual machines comprises nodes 1002, wherein each node 1002a comprises a kubelet 1002b, a kube-proxy 1002c, and at least one pod 1002d. The Kubernetes master 1001 forms the control plane managing the nodes and their states comprising the microservices they run. A pod 1002d is group of one or more containers, which in turn are standard units of software that include program code with all dependencies of the program enabling a microservice to run reliably and quickly wherever they are made to run. Thus, the microservices in containers can run on any node in the cluster. The pod 1002d shares network and storage among the containers and includes a specification of how to run its containers. The kubelet 1002b is a software agent making sure the containers are executing in a pod. The kube-proxy 1002c is a network proxy that ensures network rules are followed in communication among nodes and between the nodes and other components of the SLKRS 201e.

In the Kubernetes master 1001, the scheduler 1001a allocates nodes to pods scheduling the microservices of the microservices platform 407, exemplarily illustrated in FIG. 4, to run on the machines or the virtual machines in the cluster. The controllers 1001b ensures access through lease tokens, for example, to nodes to the microservices and manages the execution of the microservices on the nodes. The controllers 1001b also ensure fault tolerance by moving the microservices to other nodes when the nodes that they are initially running on fail. Etcd 1001c provides storage for key-value pairs for use of the nodes in the cluster. The API server 1001d is the front end for the control plane represented by the Kubernetes master 1001 providing admin access 1003 to the Kubernetes architecture allowing administration of the architecture. The Kubernetes architecture lends itself to the microservice architecture, exemplarily illustrated in FIG. 3, of the smart-learning and knowledge retrieval system (SLKRS) 201e due to the containerization of software as needed by the microservices, deployment of the microservices to create instances on different servers for faster access at different geographical locations, and scalability as needed in creating instances of microservices to cater to increases in demand for the microservices. In an embodiment, the Kubernetes architecture is used with Docker platform to enable the creation, sharing, and running of the microservices in containers. The Kubernetes architecture provides an ideal method of allocating resources to the microservices that the SLKRS 201e runs and for the features of the microservices that the microservices platform 407 uses, for example, the services container 501, security framework 502, services deployment 503, caching and cache management 505, etc., as disclosed in the detailed description of the internals of the microservices platform 407 in FIG. 5.

Figure 11:
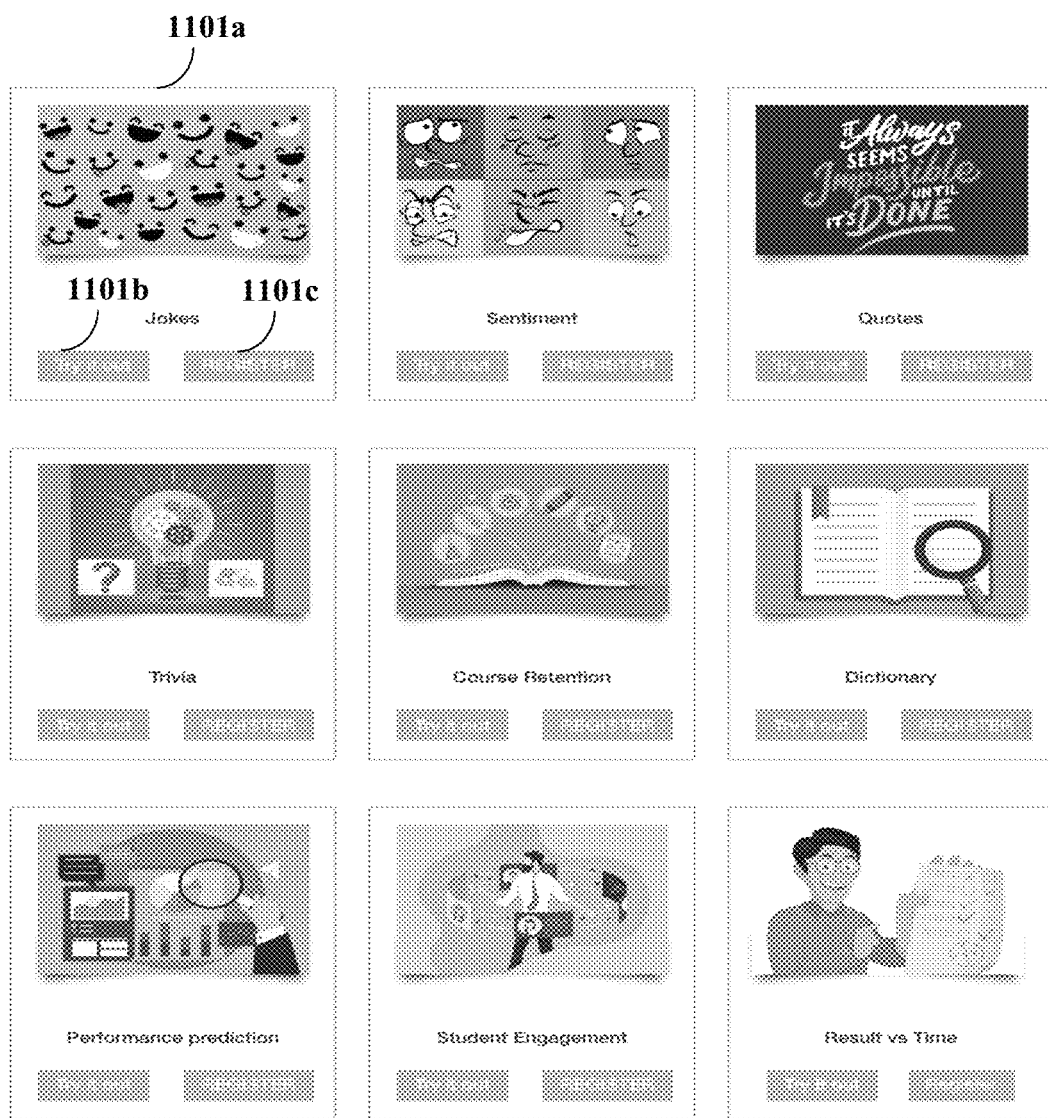
FIG. 11 exemplarily illustrates an interface that the smart-learning and knowledge retrieval system provides to knowledge seekers for accessing some of its microservices.

FIG. 11 exemplarily illustrates an interface that the smart-learning and knowledge retrieval system (SLKRS) 201e provides to knowledge seekers for accessing some of its microservices. The interface provides a trial link 1101b for knowledge seekers to try out a microservice 1101a offered by the SLKRS 201e. The knowledge seekers' access to the microservice 1101a can be limited through time bounds, bounds on features of the microservice 1101a, or on the number of times the features may be used. Through the trial, the SLKRS 201e allows a knowledge seeker to ascertain if they want to proceed with using the SLKRS 201e for their e-learning and also give him or her an overview of all the microservices 1101a that they can have access to. The interface includes a registration link 1101c for each microservice 1101a that knowledge seekers use to register for using the microservice 1101a. Through the registration process, a knowledge seeker can opt to use only the microservices 1101a that the knowledge seeker needs, later expanding on other microservices 1101a as needed. The interface provides access to the SLKRS 201e in the way the microservice architecture of the SLKRS 201e is envisioned—a modularized, scalable, and flexible method of providing individual services that is ideal for providing adaptive and personalized e-learning with the knowledge seeker in control of his or her e-learning.

Figure 12:
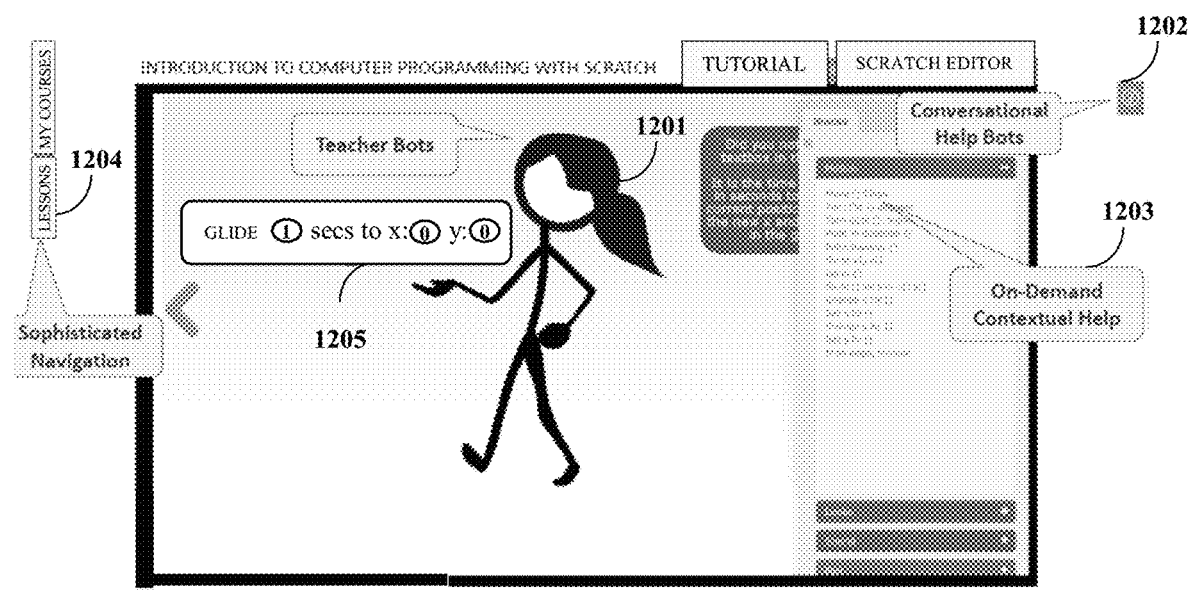
FIG. 12 illustrates a graphical user interface of an exemplary embodiment of the smart-learning and knowledge retrieval system depicting an e-learning course.

FIG. 12 illustrates a graphical user interface (GUI) 201c of an exemplary embodiment of the smart-learning and knowledge retrieval system (SLKRS) 201e depicting an e-learning course titled "Introduction to computer programming with Scratch". The GUI 201c provided by the SLKRS 201e includes a teacher bot 1201 and conversational help bots 1202 for on-demand contextual help 1203. The SLKRS 201e provides for sophisticated navigation tools 1204, exemplarily illustrated by clickable links for "lessons" and "my courses". Furthermore, there are navigation tools provided to switch between a programming tool, indicated as "scratch editor" and a tutorial. The SLKRS 201e also provides a personalized experience by providing notifications and messaging 1205. Additionally, there is rich visualization that makes the course highly interactive and immersive to enable a dynamic learning environment.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the smart-learning and knowledge retrieval system (SLKRS) 201e disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the SLKRS 201e disclosed herein are implemented as programmed elements, or non-programmed elements, or any suitable combination thereof.

Where databases are described such as the database 201o and the one or more client databases 201h, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the smart-learning and knowledge retrieval system (SLKRS) 201e, the databases are integrated to communicate with each other for enabling simultaneous updates of data linked across the databases, when there are any updates to the data in one of the databases.

The method and the smart-learning and knowledge retrieval system (SLKRS) 201e disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the smart-learning and knowledge retrieval system (SLKRS) 201e disclosed herein are not limited to a particular computer system platform, processor, operating system, or network. In an embodiment, one or more aspects of the method and the SLKRS 201e disclosed herein are distributed among one or more computer systems, for example, servers configured to provide one or more services to one or more client computers, or to perform a complete task in a distributed system. For example, one or more aspects of the method and the SLKRS 201e disclosed herein are performed on a client-server system that comprises components distributed among one or more server systems that perform multiple functions according to various embodiments. These components comprise, for example, executable, intermediate, or interpreted code, which communicate over a network using a communication protocol. The method and the SLKRS 201e disclosed herein are not limited to be executable on any particular system or group of systems, and are not limited to any particular distributed architecture, network, or communication protocol.

The foregoing examples have been provided merely for explanation and are in no way to be construed as limiting of the smart-learning and knowledge retrieval system (SLKRS) 201e disclosed herein. While the SLKRS 201e has been described with reference to various embodiments, it is understood that the words, which have been used herein, are words of description and illustration, rather than words of limitation. Furthermore, although the SLKRS 201e has been described herein with reference to particular means, materials, and embodiments, the SLKRS 201e is not intended to be limited to the particulars disclosed herein; rather, the SLKRS 201e extends to all functionally equivalent structures, methods and uses, such as are within the scope of the appended claims. While multiple embodiments are disclosed, it will be understood by those skilled in the art, having the benefit of the teachings of this specification, that the SLKRS 201e disclosed herein are capable of modifications and other embodiments may be effected and changes may be made thereto, without departing from the scope and spirit of the SLKRS 201e disclosed herein.

I claim:

1. A computer implemented method for providing adaptive and personalized e-learning based on continually, artificially learned unique characteristics of a knowledge seeker, the method employing a smart-learning and knowledge retrieval system executable by at least one processor configured to execute computer program instructions for performing the method, the method comprising:

ingesting data from a plurality of sources in a plurality of formats by the smart-learning and knowledge retrieval system;

merging the ingested data into a knowledge base to create an ontology by the smart-learning and knowledge retrieval system, wherein the ingested data is merged into the knowledge base based on computed strengths of terms found in the plurality of sources from which the data is ingested;

assimilating the merged data to generate experiences from the assimilated data by the smart-learning and knowledge retrieval system;

receiving a query from the knowledge seeker through one of a plurality of interfaces by the smart-learning and knowledge retrieval system;

retrieving one of a generated experience and an experience created based on an artificially intelligent understanding of the received query by the smart-learning and knowledge retrieval system;

sending the retrieved experience to the knowledge seeker in an immersive format via one or more of the plurality of interfaces by the smart-learning and knowledge retrieval system for the knowledge seeker to interact with the sent experience;

receiving feedback from the knowledge seeker via the one of the plurality of interfaces by the smart-learning and knowledge retrieval system in response to the sent experience;

computing a coefficient of retention for the knowledge seeker continually based on each of the received query and the received feedback by the smart-learning and knowledge retrieval system, wherein the coefficient of retention for the knowledge seeker is computed by testing the ability of the knowledge seeker to recall a concept after passage of a predetermined length of time and after being exposed to a predetermined number of applications of said concept, thereby artificially learning unique characteristics of the knowledge seeker for measuring an ability of the knowledge seeker to learn and to show continued interest in an e-learning course; and generating interventions and improved experiences by the smart-learning and knowledge retrieval system to provide adaptive and personalized e-learning to the knowledge seeker based on the computed coefficient of retention for the knowledge seeker.

2. The computer implemented method of claim 1, wherein a retention graph of said coefficient of retention directionally indicates retention of information of the concept by the knowledge seeker.

3. The computer implemented method of claim 2, wherein said retention graph depicts points of assessments and observations.

4. The computer implemented method of claim 1, wherein said coefficient of retention has a range between 0 and 1.

5. The computer implemented method of claim 1, wherein said coefficient of retention is concept specific, and specific to the knowledge seeker.

6. The computer implemented method of claim 1, wherein said coefficient of retention is periodically computed for the knowledge seeker, and if the coefficient of retention falls below a predetermined threshold, the knowledge seeker is directed to repeat a topic or an entire lesson.

7. The computer implemented method of claim 1, wherein said coefficient of retention is computed as a function of time spent by the knowledge seeker on a concept and the number of applications of a concept that the knowledge seeker is exposed to.

8. The computer implemented method of claim 1, wherein inputs to compute said coefficient of retention comprise one or more of time spent on a topic of study, frequency of visit to the topic, time period between visits to the topic, time spent on each visit to the topic, usage patterns of reading material in the topic, performance in tests conducted on the topic, and a click pattern while engaging with the topic.

9. The computer implemented method of claim 1, wherein said coefficient of retention is an input to generate a personalized learning path of the knowledge seeker.

10. An electronic device employing a smart-learning and knowledge retrieval system for providing adaptive and personalized e-learning based on continually artificially learned unique characteristics of a knowledge seeker, the electronic device comprising:
  a non-transitory computer readable storage medium configured to store computer program instructions defined by the smart-learning and knowledge retrieval system;
  at least one processor communicatively coupled to the non-transitory computer readable storage medium, the at least one processor configured to execute the computer program instructions;
  a display screen configured to display a graphical user interface provided by the smart-learning and knowledge retrieval system; and
  the smart-learning and knowledge retrieval system comprising:
    an ingestion module configured to ingest data from a plurality of sources in a plurality of formats;
    a merge module configured to merge the ingested data into a knowledge base to create an ontology, wherein the ingested data is merged into the knowledge base based on strengths of terms found in the plurality of sources from which the data is ingested, and wherein the strengths of the terms are computed by a computation module;
    an assimilation module configured to assimilate the merged data to generate experiences from the assimilated data;
    a data transfer module configured to receive a query from the knowledge seeker through one of a plurality of interfaces via the graphical user interface on the electronic device;
    a retrieval module configured to retrieve one of a generated experience and an experience created based on an artificially intelligent understanding of the received query;
    the data transfer module further configured to send the retrieved experience to the knowledge seeker in an immersive format via one or more of the plurality of interfaces for the knowledge seeker to interact with the sent experience;
    the data transfer module further configured to receive feedback from the knowledge seeker via the one of the plurality of interfaces in response to the sent experience;
    the computation module further configured to compute a coefficient of retention for the knowledge seeker wherein the coefficient of retention for the knowledge seeker is computed by testing the ability of the knowledge seeker to recall a concept after passage of a predetermined length of time and after being exposed to a predetermined number of applications of said concept, thereby artificially learning unique characteristics of the knowledge seeker for measuring an ability of the knowledge seeker to learn and to show continued interest in an e-learning course; and
    an intervention module configured to generate interventions and improved experiences to provide adaptive and personalized e-learning to the knowledge seeker based on the computed coefficient of retention for the knowledge seeker.

11. The electronic device of claim 10, wherein the computation module computes a retention graph of said coefficient of retention that is directionally indicative of retention of information of the concept by the knowledge seeker.

12. The electronic device of claim 11, wherein said retention graph depicts points of assessments and observations.

13. The electronic device of claim 10, wherein said coefficient of retention has a range between 0 and 1.

14. The electronic device of claim 10, wherein said coefficient of retention is concept specific, and specific to the knowledge seeker.

15. The electronic device of claim 10, wherein said coefficient of retention is periodically computed by the computation module for the knowledge seeker, and if the coefficient of retention falls below a predetermined threshold, the knowledge seeker will be directed to repeat a topic or an entire lesson.

16. The electronic device of claim 10, wherein said computation module computes the coefficient of retention as a function of time spent by the knowledge seeker on a concept and the number of applications of a concept that the knowledge seeker is exposed to.

17. The electronic device of claim 10, wherein inputs to the computation module to compute said coefficient of retention comprise one or more of time spent on a topic of study, frequency of visit to the topic, time period between visits to the topic, time spent on each visit to the topic, usage patterns of reading material in the topic, performance in tests conducted on the topic, and click pattern while engaging with the topic.

18. The electronic device of claim 10, wherein said coefficient of retention computed by the computation module is an input to generate a personalized learning path of the knowledge seeker.

19. A non-transitory computer readable storage medium having embodied thereon, computer program codes comprising instructions executable by at least one processor for providing adaptive and personalized e-learning based on continually artificially learned unique characteristics of a knowledge seeker, the computer program codes comprising:
  a first computer program code for ingesting data from a plurality of sources in a plurality of formats;
  a second computer program code for merging the ingested data into a knowledge base to create an ontology, wherein the ingested data is merged into the knowledge base based on computed strengths of terms found in the plurality of sources from which the data is ingested;
  a third computer program code for assimilating the merged data to generate experiences from the assimilated data;
  a fourth computer program code for receiving a query from the knowledge seeker through one of a plurality of interfaces;
  a fifth computer program code for retrieving one of a generated experience and an experience created based on an artificially intelligent understanding of the received query;
  a sixth computer program code for sending the retrieved experience to the knowledge seeker in an immersive format via one or more of the plurality of interfaces for the knowledge seeker to interact with the sent experience;
  a seventh computer program code for receiving feedback from the knowledge seeker via the one of the plurality of interfaces in response to the sent experience;
  an eighth computer program code for computing a coefficient of retention for the knowledge seeker wherein the coefficient of retention for the knowledge seeker is computed based on a test of the ability of the knowledge seeker to recall a concept after passage of a predetermined length of time and after being exposed to a predetermined number of applications of said concept, thereby artificially learning unique characteristics of the knowledge seeker for measuring an ability of the knowledge seeker to learn and to show continued interest in an e-learning course; and a ninth computer program code for generating interventions and improved experiences to provide adaptive and personalized e-learning to the knowledge seeker based on the computed coefficient of retention for the knowledge seeker.

20. The non-transitory computer readable storage medium of claim 19, wherein the eighth computer program code computes a retention graph of said coefficient of retention that is directionally indicative of retention of information of the concept by the knowledge seeker.

\* \* \* \* \*